(12) United States Patent
Wang

(10) Patent No.: US 12,389,025 B2
(45) Date of Patent: Aug. 12, 2025

(54) SCALABLE NESTING OF SUPPLEMENTAL ENHANCEMENT INFORMATION MESSAGES IN VIDEO CODING

(71) Applicant: Bytedance Inc., Los Angeles, CA (US)

(72) Inventor: Ye-kui Wang, San Diego, CA (US)

(73) Assignee: Bytedance Inc., Los Angeles, CA (US)

( * ) Notice: Subject to any disclaimer, the term of this patent is extended or adjusted under 35 U.S.C. 154(b) by 0 days.

(21) Appl. No.: 18/520,196

(22) Filed: Nov. 27, 2023

(65) Prior Publication Data

US 2024/0098292 A1     Mar. 21, 2024

Related U.S. Application Data

(63) Continuation of application No. 18/077,843, filed on Dec. 8, 2022, now Pat. No. 11,838,529, which is a
(Continued)

(51) Int. Cl.
*H04N 19/46* (2014.01)
*H04N 19/169* (2014.01)
*H04N 19/172* (2014.01)
*H04N 19/187* (2014.01)
*H04N 19/70* (2014.01)

(52) U.S. Cl.
CPC .......... *H04N 19/46* (2014.11); *H04N 19/172* (2014.11); *H04N 19/187* (2014.11); *H04N 19/188* (2014.11); *H04N 19/70* (2014.11)

(58) Field of Classification Search
None
See application file for complete search history.

(56) References Cited

U.S. PATENT DOCUMENTS

| 9,872,062 B1 | 1/2018 | Rombakh |
| 11,917,184 B2 | 2/2024 | Wang |

(Continued)

FOREIGN PATENT DOCUMENTS

| CN | 101313578 A | 11/2008 |
| CN | 104685891 A | 6/2015 |

(Continued)

OTHER PUBLICATIONS

JVET-S0152-v5, Wang, Y., "AHG2: Editorial input of a text integration for the May 2020 HLS AHG meeting outcome," Joint Video Experts Team (JVET) of ITU-T SG 16 WP 3 and ISO/IEC JTC 1/SC 29/WG 11 19th Meeting: by teleconference, Jun. 22-Jul. 1, 2020, 5 pages.

(Continued)

*Primary Examiner* — Christopher Braniff
(74) *Attorney, Agent, or Firm* — Conley Rose, P.C.

(57) ABSTRACT

Several embodiments for video encoding and video decoding are described. An example method of processing video data includes performing a conversion between a video including one or more subpictures and a bitstream of the video, wherein one or more supplemental enhancement information messages that have filler payloads are processed during the conversion according to a format rule, and wherein the format rule disallows the one or more supplemental enhancement information messages having filler payloads to be in a scalable nesting supplemental enhancement information message.

19 Claims, 17 Drawing Sheets

Related U.S. Application Data continuation of application No. PCT/US2021/036345, filed on Jun. 8, 2021.

(60) Provisional application No. 63/036,743, filed on Jun. 9, 2020.

(56) References Cited

U.S. PATENT DOCUMENTS

| | | |
|---|---|---|
| 11,997,301 B2 | 5/2024 | Wang |
| 2003/0146855 A1 | 8/2003 | Sullivan |
| 2008/0007438 A1 | 1/2008 | Segall |
| 2014/0016707 A1 | 1/2014 | Wang |
| 2014/0086341 A1 | 3/2014 | Wang |
| 2014/0098895 A1 | 4/2014 | Wang |
| 2014/0192149 A1* | 7/2014 | Wang ............... H04N 19/30 348/43 |
| 2014/0219346 A1 | 8/2014 | Ugur |
| 2015/0271525 A1 | 9/2015 | Hendry |
| 2015/0373374 A1 | 12/2015 | Ramasubramonian |
| 2016/0234522 A1 | 8/2016 | Lu |
| 2016/0286226 A1 | 9/2016 | Ridge |
| 2016/0381394 A1 | 12/2016 | Sychev |
| 2018/0014033 A1 | 1/2018 | Wu |
| 2018/0139475 A1 | 5/2018 | Hwang |
| 2018/0255323 A1 | 9/2018 | Wang |
| 2019/0116366 A1 | 4/2019 | Andrivon |
| 2019/0132610 A1 | 5/2019 | Wahadaniah |
| 2020/0077107 A1 | 3/2020 | Deshpande |
| 2021/0392332 A1* | 12/2021 | Choi ............... H04N 19/70 |
| 2022/0217381 A1 | 7/2022 | Wang |
| 2022/0217393 A1 | 7/2022 | Wang |
| 2022/0217394 A1 | 7/2022 | Wang |
| 2022/0217395 A1 | 7/2022 | Wang |
| 2022/0217417 A1 | 7/2022 | Wang |
| 2022/0337846 A1* | 10/2022 | Ouedraogo et al. ............... H04N 21/4347 |
| 2023/0224479 A1* | 7/2023 | Sánchez De La Fuente ............... H04N 19/184 375/240.02 |

FOREIGN PATENT DOCUMENTS

| | | |
|---|---|---|
| CN | 104685893 A | 6/2015 |
| IN | 201947028387 A | 9/2019 |
| JP | 2022549643 A | 11/2022 |
| WO | 2021061393 A1 | 4/2021 |

OTHER PUBLICATIONS

Information technology—High efficiency coding and media delivery in heterogeneous environments—Part 2: High efficiency video coding, Rec. ITU-T H.265 | ISO/IEC 23008-2:201x (4th Ed.) (in force edition), Apr. 20, 2018, 8 pages.
Document: JVET-G1001-v1, Chen, J., et al., "Algorithm Description of Joint Exploration Test Model 7 (JEM 7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.
Document: JVET-R2001-vB, Bross, B., et al., "Versatile Video Coding (Draft 9)," Joint Video Experts Team (JVET) of ITU-T SG 16 WP 3 and ISO/IEC JTC 1/SC 29/WG 11 18th Meeting: by teleconference, Apr. 15-24, 2020, 530 pages.
Document: JVET-Q2002-v3, Chen, J., et al., "Algorithm description for Versatile Video Coding and Test Model 8 (VTM 8)," Joint Video Experts Team (JVET) of ITU-T SG 16 WP 3 and ISO/IEC JTC 1/SC 29/WG 11 17th Meeting: Brussels, BE, Jan. 7-17, 2020, 97 pages.
Galpin, F., VTM software: Retrieved from the internet: https://vcgit.hhi.fraunhofer.de/jvet/VVCSoftware_VTM.git, Mar. 3, 2023, 8 pages.
Document: JCTVC-AC1005-v2, Boyce, J., et al., "HEVC Additional Supplemental Enhancement4)," Joint Collaborative Team on Video Coding (JCT-VC) of ITU-T SG 16 WP 3 and ISO/IECMeeting: Macao, CN, Oct. 19-25, 2017, 56 pages.
Schierl, T., et al., "Mobile Video Transmission Using Scalable Video Coding," IEEE Transactions on Circuits and Systems for Video Technology, vol. 17, No. 9, Sep. 2007, 14 pages.
Vetro, A., et al., "Overview of the Stereo and Multiview Video Coding Extensions of the H.264_MPEG-4 AVC Standard," Proceedings of the IEEE | vol. 99,No. 4, Apr. 2011, 17 pages.
Document: JVET-S0152-v4, Wang, Y.K., et al., "AHG2: Editorial input of a text integration for the May 2020 HLS AHG meeting outcome," Joint Video Experts Team (JVET) of ITU-T SG 16 WP 3 and ISO/IEC JTC 1/SC 29/WG 11 19th Meeting: by teleconference, Jun. 22-Jul. 1, 2020, 5 pages.
Document: JVET-R0294-v1, Suehring, K., et al., "AHG12: On subpicture extraction," Joint Video Experts Team (JVET) of ITU-T SG 16 WP 3 and ISO/IEC JTC 1/SC 29/WG 11 18th Meeting: by teleconference, Apr. 15-24, 2020, 6 pages.
Document: JVET-S0177-v2, Wang, Y.K., et al., "AHG9: On the scalable nesting SEI message," Joint Video Experts Team (JVET) of ITU-T SG 16 WP 3 and ISO/IEC JTC 1/SC 29/WG 11 19th Meeting: by teleconference, Jun. 22-Jul. 1, 2020, 5 pages.
Document: JVET-P0190-v1, Wang, Y.K., et al., "AHG8/AHG17: Scalable nesting SEI message," Joint Video Experts Team (JVET) of ITU-T SG 16 WP 3 and ISO/IEC JTC 1/SC 29/WG 11 16th Meeting: Geneva, CH, Oct. 1-11, 2019, 4 pages.
Foreign Communication From a Related Counterpart Application, PCT Application No. PCT/US2021/036345, International Search Report dated Nov. 15, 2021, 10 pages.
Foreign Communication From a Related Counterpart Application, PCT Application No. PCT/US2021/036349, International Search Report dated Sep. 14, 2021, 16 pages.
Foreign Communication From a Related Counterpart Application, PCT Application No. PCT/US2021/036353, International Search Report dated Sep. 27, 2021, 13 pages.
Non-Final Office Action dated Apr. 17, 2023, 17 pages, U.S. Appl. No. 18/077,901, filed Dec. 8, 2022.
Notice of Allowance dated Apr. 4, 2023, 15 pages, U.S. Appl. No. 18/076,906, filed Dec. 7, 2022.
Non-Final Office Action dated Jul. 17, 2023, 15 pages, U.S. Appl. No. 18/076,906, filed Dec. 7, 2022.
Non-Final Office Action dated Apr. 13, 2023, 12 pages, U.S. Appl. No. 18/077,843, filed Dec. 8, 2022.
Extended European Search Report from European Application No. 21821393.2 dated Sep. 12, 2023, 13 pages.
Extended European Search Report from European Application No. 21822023.4 dated Sep. 12, 2023, 12 pages.
Extended European Search Report from European Application No. 21822859.1 dated Aug. 31, 2023, 9 pages.
Document: JVET-R2001-vA, Benjamin Bross "Versatile Video Coding (Draft 9)," Joint Video Experts Team (JVET) of ITU-T SG 16 WP 3 and ISO/IEC JTC1/SC 29/WG 11, 18th Meeting: by teleconference, Apr. 15-24, 2020, 7 pages.
Japanese Office Action From JP Patent Application No. 2022-575425 dated Mar. 5, 2024, 9 pages, with English translation.
Japanese Office Action From JP Patent Application No. 2022-575424 dated Mar. 12, 2024, 15 pages, with English translation.
Chinese Office Action from Chinese Patent Application 202180041817.1 dated May 19, 2025, 15 pages.
Document: JVET-Q0404, Skupin, R., et al., "AHG12: On CBR subpicture extraction," Joint Video Experts Team (JVET) of ITU-T SG 16 WP 3 and ISO/IEC JTC 1/SC 29/WG 11, 17th Metting: Brussels, BE, Jan. 7-17, 2020, 5 pages.
Chiense Office Action from Chinese Patent Application No. 20218004188.1 dated Jul. 4, 2025, 23 pages.

* cited by examiner

SCALABLE NESTING OF SUPPLEMENTAL ENHANCEMENT INFORMATION MESSAGES IN VIDEO CODING

CROSS-REFERENCE TO RELATED APPLICATIONS

This application is a continuation of U.S. application Ser. No. 18/077,843, filed on Dec. 8, 2022, which is a continuation of International Patent Application No. PCT/US2021/036345 filed on Jun. 8, 2021, which claims the priority to and benefits of U.S. Provisional patent application No. 63/036,743 filed on Jun. 9, 2020. All the aforementioned patent applications are hereby incorporated by reference in their entireties.

TECHNICAL FIELD

The present disclosure relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present disclosure discloses embodiments that can be used by video encoders and decoders for processing a coded representation of a video or an image.

In one example aspect, a video processing method is disclosed. The method includes performing a conversion between a video comprising one or more subpictures and a bitstream of the video, wherein one or more supplemental enhancement information messages that have filler payloads are processed during the conversion according to a format rule, and wherein the format rule disallows the one or more supplemental enhancement information messages having filler payloads to be in a scalable nesting supplemental enhancement information message.

In another example aspect, a video processing method is disclosed. The method includes performing a conversion between a video and a bitstream of the video, wherein one or more syntax elements are processed during the conversion according to a format rule, and wherein the format rule specifies that the one or more syntax elements are used for indicating subpicture information for layers of the video that have pictures with multiple subpictures.

In another example aspect, a video processing method is disclosed. The method includes performing a conversion between a video comprising a plurality of subpictures and a bitstream of the video, wherein a scalable-nested supplemental enhancement information message is processed during the conversion according to a format rule, and wherein the format rule specifies use of one or more subpicture indices to associate one or more subpictures to the scalable-nested supplemental enhancement information message.

In another example aspect, a video processing method is disclosed. The method includes performing a conversion between a video comprising one or more subpictures and a bitstream of the video according to a format rule, wherein the format rule specifies that a first syntax element in a scalable nesting supplemental enhancement information message in the bitstream is set to a particular value in response to the scalable nesting supplemental enhancement information message including one or more subpicture level information supplemental enhancement information messages, and wherein the particular value of the first syntax element indicates that the scalable nesting supplemental enhancement information message includes one or more scalable-nested supplemental enhancement information messages that apply to a specific output video layer set.

In another example aspect, a video processing method is disclosed. The method includes performing a conversion between a video comprising a plurality of subpictures and a bitstream of the video, wherein the conversion is according to a format rule that specifies that a scalable nesting supplemental enhancement information message is disallowed from including a first supplemental enhancement information message of a first payload type and a second supplemental enhancement information message of a second payload type.

In another example aspect, a video processing method is disclosed. The method includes performing a conversion between a video and a bitstream of the video, wherein the conversion is performed according to a format rule that specifies that a supplemental enhancement information network abstraction layer unit includes a network abstraction layer unit type equal to a prefix supplemental enhancement information network abstraction layer unit type in response to the supplemental enhancement information network abstraction layer unit including a scalable nesting supplemental enhancement information message that includes a supplemental enhancement information message not associated with a particular payload type.

In another example aspect, a video processing method is disclosed. The method includes performing a conversion between a video and a bitstream of the video, wherein the conversion is performed according to a format rule that specifies that a supplemental enhancement information network abstraction layer unit includes a network abstraction layer unit type equal to a suffix supplemental enhancement information network abstraction layer unit type in response to the supplemental enhancement information network abstraction layer unit including a scalable nesting supplemental enhancement information message that includes a supplemental enhancement information message associated with a particular payload type.

In another example aspect, a video processing method is disclosed. The method includes performing a conversion between a video comprising one or more subpictures or one or more subpicture sequences and a coded representation of the video, wherein the coded representation conforms to a format rule specifying whether or how scalable-nested supplemental enhancement information (SEI) is included in the coded representation.

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclosed. The code embodies one of the methods described herein in the form of processor-executable code.

DETAILED DESCRIPTION

Figure 2:
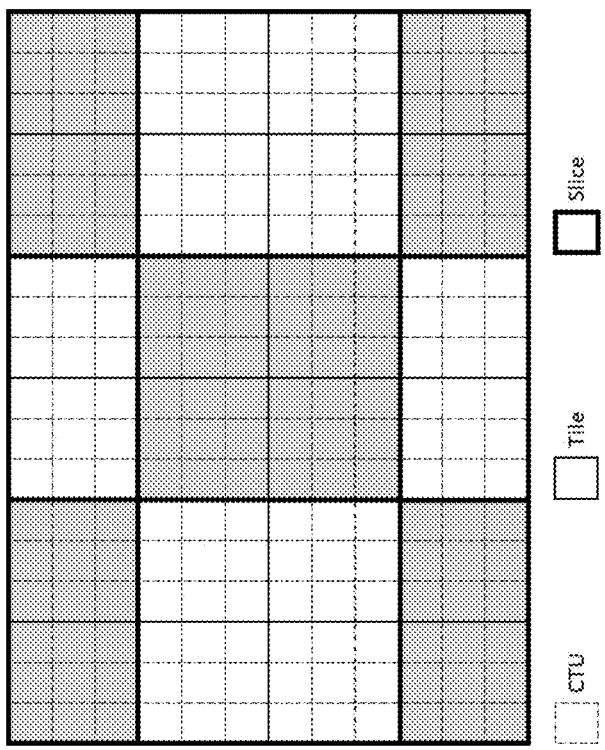
FIG. 2 shows an example of rectangular slice partitioning of a picture, where the picture is divided into 24 tiles (6 tile columns and 4 tile rows) and 9 rectangular slices.

Section headings are used in the present disclosure for ease of understanding and do not limit the applicability of embodiments disclosed in each section only to that section. Furthermore, H.266 terminology is used in some description only for ease of understanding and not for limiting scope of the disclosed embodiments. As such, the embodiments described herein are applicable to other video codec protocols and designs also. In the present disclosure, editing changes are shown to text with double square brackets enclosing cancelled text, and highlight (e.g., boldface italics) indicating added text, with respect to the current draft of the versatile video coding (VVC) specification.

1. Introduction

This disclosure is related to video coding technologies. Specifically, it is about specifying and signalling level information for subpicture sequences. It may be applied to any video coding standard or non-standard video codec that supports single-layer video coding and multi-layer video coding, e.g., VVC that is being developed.

2. Abbreviations

APS Adaptation Parameter Set
AU Access Unit
AUD Access Unit Delimiter
AVC Advanced Video Coding
BP Buffering Period
CLVS Coded Layer Video Sequence
CPB Coded Picture Buffer
CRA Clean Random Access
CTU Coding Tree Unit
CVS Coded Video Sequence
DPB Decoded Picture Buffer
DPS Decoding Parameter Set
DUI Decoding Unit Information
EOB End Of Bitstream
EOS End Of Sequence
GCI General Constraints Information
GDR Gradual Decoding Refresh
HEVC High Efficiency Video Coding
HRD Hypothetical Reference Decoder
IDR Instantaneous Decoding Refresh
IRAP Intra Random Access Points
JEM Joint Exploration Model
MCTS Motion-Constrained Tile Sets
NAL Network Abstraction Layer
OLS Output Layer Set
PH Picture Header
PPS Picture Parameter Set
PT Picture Timing
PTL Profile, Tier and Level
PU Picture Unit
RRP Reference Picture Resampling
RBSP Raw Byte Sequence Payload
SEI Supplemental Enhancement Information
SH Slice Header
SLI Subpicture Level Information
SPS Sequence Parameter Set
SVC Scalable Video Coding
VCL Video Coding Layer
VPS Video Parameter Set
VTM VVC Test Model
VUI Video Usability Information
VVC Versatile Video Coding

3. Initial Discussion

Video coding standards have evolved primarily through the development of the well-known International Telecommunication Union (ITU) Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, the Joint Video Exploration Team (JVET) was founded by Video Coding Experts Group (VCEG) and MPEG jointly in 2015. Since then, many new methods have been adopted by JVET and put into the reference software named Joint Exploration Model (JEM). The JVET meeting is concurrently held once every quarter, and the new coding standard is targeting a 50% bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting. The VVC working draft and test model VTM are then updated after every meeting. The VVC project is now aiming for technical completion (FDIS) at the July 2020 meeting.

3.1. Picture Partitioning Schemes in HEVC

HEVC includes four different picture partitioning schemes, namely regular slices, dependent slices, tiles, and wavefront parallel processing (WPP), which may be applied for maximum transfer unit (MTU) size matching, parallel processing, and reduced end-to-end delay.

Regular slices are similar as in H.264/AVC. Each regular slice is encapsulated in its own NAL unit, and in-picture prediction (intra sample prediction, motion information prediction, coding mode prediction) and entropy coding dependency across slice boundaries are disabled. Thus, a regular slice can be reconstructed independently from other regular slices within the same picture (though there may still have interdependencies due to loop filtering operations).

The regular slice is the only tool that can be used for parallelization that is also available, in virtually identical form, in H.264/AVC. Regular slice-based parallelization does not require much inter-processor or inter-core communication (except for inter-processor or inter-core data sharing for motion compensation when decoding a predictively coded picture, which is typically much heavier than inter-processor or inter-core data sharing due to in-picture prediction). However, for the same reason, the use of regular slices can incur substantial coding overhead due to the bit cost of the slice header and due to the lack of prediction across the slice boundaries. Further, regular slices (in contrast to the other tools mentioned below) also serve as the key mechanism for bitstream partitioning to match MTU size requirements, due to the in-picture independence of regular slices and that each regular slice is encapsulated in its own NAL unit. In many cases, the goal of parallelization and the goal of MTU size matching place contradicting demands to the slice layout in a picture. The realization of this situation led to the development of the parallelization tools mentioned below.

Dependent slices have short slice headers and allow partitioning of the bitstream at treeblock boundaries without breaking any in-picture prediction. Basically, dependent slices provide fragmentation of regular slices into multiple NAL units, to provide reduced end-to-end delay by allowing a part of a regular slice to be sent out before the encoding of the entire regular slice is finished.

In WPP, the picture is partitioned into single rows of coding tree blocks (CTBs). Entropy decoding and prediction are allowed to use data from CTBs in other partitions. Parallel processing is possible through parallel decoding of CTB rows, where the start of the decoding of a CTB row is delayed by two CTBs, so to ensure that data related to a CTB above and to the right of the subject CTB is available before the subject CTB is being decoded. Using this staggered start (which appears like a wavefront when represented graphically), parallelization is possible with up to as many processors/cores as the picture contains CTB rows. Because in-picture prediction between neighboring treeblock rows within a picture is permitted, the required inter-processor/inter-core communication to enable in-picture prediction can be substantial. The WPP partitioning does not result in the production of additional NAL units compared to when it is not applied, thus WPP is not a tool for MTU size matching. However, if MTU size matching is required, regular slices can be used with WPP, with certain coding overhead.

Tiles define horizontal and vertical boundaries that partition a picture into tile columns and rows. Tile column runs from the top of a picture to the bottom of the picture. Likewise, tile row runs from the left of the picture to the right of the picture. The number of tiles in a picture can be derived simply as number of tile columns multiplied by number of tile rows.

The scan order of CTBs is changed to be local within a tile (in the order of a CTB raster scan of a tile), before decoding the top-left CTB of the next tile in the order of tile raster scan of a picture. Similar to regular slices, tiles break in-picture prediction dependencies as well as entropy decoding dependencies. However, they do not need to be included into individual NAL units (same as WPP in this regard); hence, tiles cannot be used for MTU size matching. Each tile can be processed by one processor/core, and the inter-processor/inter-core communication required for in-picture prediction between processing units decoding neighboring tiles is limited to conveying the shared slice header in cases a slice is spanning more than one tile, and loop filtering related sharing of reconstructed samples and metadata. When more than one tile or WPP segment is included in a slice, the entry point byte offset for each tile or WPP segment other than the first one in the slice is signalled in the slice header.

For simplicity, restrictions on the application of the four different picture partitioning schemes have been specified in HEVC. A given coded video sequence cannot include both tiles and wavefronts for most of the profiles specified in HEVC. For each slice and tile, either or both of the following conditions must be fulfilled: 1) all coded treeblocks in a slice belong to the same tile; 2) all coded treeblocks in a tile belong to the same slice. Finally, a wavefront segment contains exactly one CTB row, and when WPP is in use, if a slice starts within a CTB row, it must end in the same CTB row.

A recent amendment to HEVC is specified in the JCT-VC output document JCTVC-AC1005, J. Boyce, A. Ramasubramonian, R. Skupin, G. J. Sullivan, A. Tourapis, Y.-K. Wang (editors), "HEVC Additional Supplemental Enhancement Information (Draft 4)," Oct. 24, 2017, publicly available herein: http://phenix.int-evry.fr/jct/doc_end_user/documents/29_Macau/wg11/JCTVC-AC1005-v2.zip. With this amendment included, HEVC specifies three MCTS-related SEI messages, namely temporal MCTSs SEI message, MCTSs extraction information set SEI message, and MCTSs extraction information nesting SEI message.

The temporal MCTSs SEI message indicates existence of MCTSs in the bitstream and signals the MCTSs. For each MCTS, motion vectors are restricted to point to full-sample locations inside the MCTS and to fractional-sample locations that require only full-sample locations inside the MCTS for interpolation, and the usage of motion vector candidates for temporal motion vector prediction derived from blocks outside the MCTS is disallowed. This way, each MCTS may be independently decoded without the existence of tiles not included in the MCTS.

The MCTSs extraction information sets SEI message provides supplemental information that can be used in the MCTS sub-bitstream extraction (specified as part of the semantics of the SEI message) to generate a conforming bitstream for an MCTS set. The information consists of a number of extraction information sets, each defining a number of MCTS sets and containing RBSP bytes of the replacement VPSs, SPSs, and PPSs to be used during the MCTS sub-bitstream extraction process. When extracting a sub-bitstream according to the MCTS sub-bitstream extraction process, parameter sets (VPSs, SPSs, and PPSs) need to be rewritten or replaced, slice headers need to be slightly updated because one or all of the slice address related syntax elements (including first_slice_segment_in_pic_flag and slice_segment_address) typically would need to have different values.

3.2. Partitioning of Pictures in VVC

In VVC, a picture is divided into one or more tile rows and one or more tile columns. A tile is a sequence of CTUs that covers a rectangular region of a picture. The CTUs in a tile are scanned in raster scan order within that tile.

A slice consists of an integer number of complete tiles or an integer number of consecutive complete CTU rows within a tile of a picture.

Two modes of slices are supported, namely the raster-scan slice mode and the rectangular slice mode. In the raster-scan slice mode, a slice contains a sequence of complete tiles in a tile raster scan of a picture. In the rectangular slice mode, a slice contains either a number of complete tiles that collectively form a rectangular region of the picture or a number of consecutive complete CTU rows of one tile that collectively form a rectangular region of the picture. Tiles within a rectangular slice are scanned in tile raster scan order within the rectangular region corresponding to that slice.

A subpicture contains one or more slices that collectively cover a rectangular region of a picture.

Figure 1:
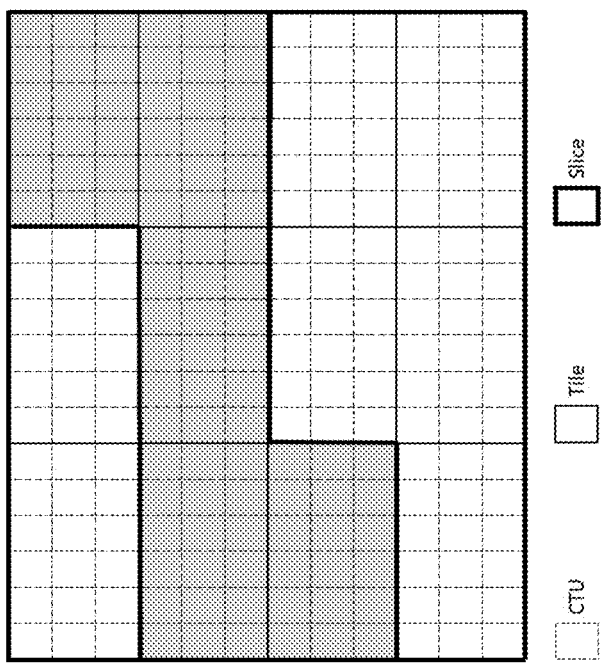
FIG. 1 shows an example of raster-scan slice partitioning of a picture, where the picture is divided into 12 tiles and 3 raster-scan slices.

FIG. 1 shows an example of raster-scan slice partitioning of a picture, where the picture is divided into 12 tiles and 3 raster-scan slices.

FIG. 2 shows an example of rectangular slice partitioning of a picture, where the picture is divided into 24 tiles (6 tile columns and 4 tile rows) and 9 rectangular slices.

Figures 3, 4:
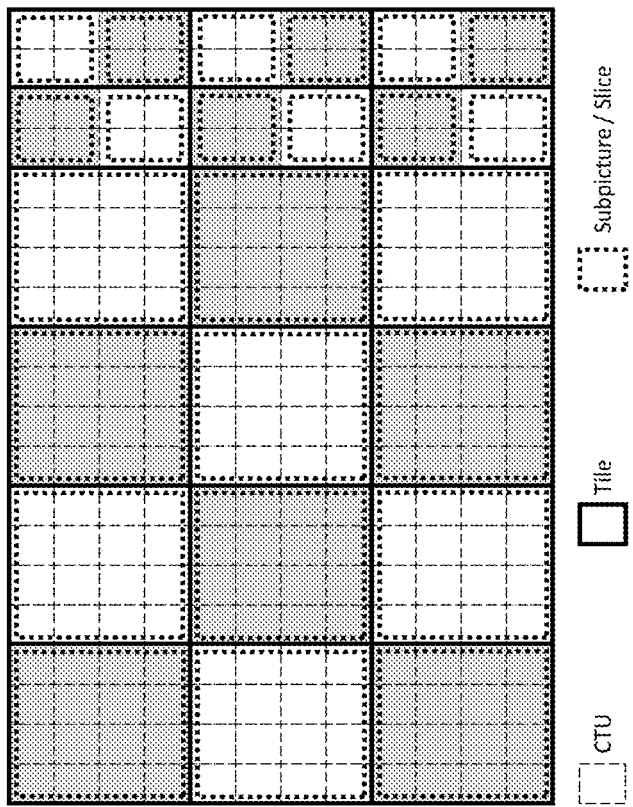
FIG. 3 shows an example of a picture partitioned into tiles and rectangular slices, where the picture is divided into 4 tiles (2 tile columns and 2 tile rows) and 4 rectangular slices.
FIG. 4 shows a picture that is partitioned into 15 tiles, 24 slices, and 24 subpictures.

FIG. 3 shows an example of a picture partitioned into tiles and rectangular slices, where the picture is divided into 4 tiles (2 tile columns and 2 tile rows) and 4 rectangular slices.

FIG. 4 shows an example of subpicture partitioning of a picture, where a picture is partitioned into 18 tiles: 12 on the left-hand side, each covering one slice of 4-by-4 CTUs; and 6 tiles on the right-hand side, each covering 2 vertically-stacked slices of 2-by-2 CTUs, altogether resulting in 24 slices and 24 subpictures of varying dimensions (each slice is a subpicture).

3.3. Picture Resolution Change Within a Sequence

In AVC and HEVC, the spatial resolution of pictures cannot change unless a new sequence using a new SPS starts, with an IRAP picture. VVC enables picture resolution change within a sequence at a position without encoding an IRAP picture, which is always intra-coded. This feature is sometimes referred to as reference picture resampling (RPR), as the feature needs resampling of a reference picture used for inter prediction when that reference picture has a different resolution than the current picture being decoded.

The scaling ratio is restricted to be greater than or equal to 1/2 (2 times downsampling from the reference picture to the current picture), and less than or equal to 8 (8 times upsampling). Three sets of resampling filters with different frequency cutoffs are specified to handle various scaling ratios between a reference picture and the current picture. The three sets of resampling filters are applied respectively for the scaling ratio ranging from 1/2 to 1/1.75, from 1/1.75 to 1/1.25, and from 1/1.25 to 8. Each set of resampling filters has 16 phases for luma and 32 phases for chroma which is same to the case of motion compensation interpolation filters. Actually, the normal MC interpolation process is a special case of the resampling process with scaling ratio ranging from 1/1.25 to 8. The horizontal and vertical scaling ratios are derived based on picture width and height, and the left, right, top and bottom scaling offsets specified for the reference picture and the current picture.

Other aspects of the VVC design for support of this feature that are different from HEVC include: i) the picture resolution and the corresponding conformance window are signalled in the PPS instead of in the SPS, while in the SPS the maximum picture resolution is signalled; and ii) for a single-layer bitstream, each picture store (a slot in the DPB for storage of one decoded picture) occupies the buffer size as required for storing a decoded picture having the maximum picture resolution.

3.4. Scalable Video Coding (SVC) in General and in VVC

Scalable video coding (SVC, sometimes also referred to as scalability in video coding) refers to video coding in which a base layer (BL), sometimes referred to as a reference layer (RL), and one or more scalable enhancement layers (ELs) are used. In SVC, the base layer can carry video data with a base level of quality. The one or more enhancement layers can carry additional video data to support, for example, higher spatial, temporal, and/or signal-to-noise (SNR) levels. Enhancement layers may be defined relative to a previously encoded layer. For example, a bottom layer may serve as a BL, while a top layer may serve as an EL. Middle layers may serve as either ELs or RLs, or both. For example, a middle layer (e.g., a layer that is neither the lowest layer nor the highest layer) may be an EL for the layers below the middle layer, such as the base layer or any intervening enhancement layers, and at the same time serve as a RL for one or more enhancement layers above the middle layer. Similarly, in the multiview or three-dimensional (3D) extension of the HEVC standard, there may be multiple views, and information of one view may be utilized to code (e.g., encode or decode) the information of another view (e.g., motion estimation, motion vector prediction and/or other redundancies).

In SVC, the parameters used by the encoder or the decoder are grouped into parameter sets based on the coding level (e.g., video-level, sequence-level, picture-level, slice level, etc.) in which they may be utilized. For example, parameters that may be utilized by one or more coded video sequences of different layers in the bitstream may be included in a video parameter set (VPS), and parameters that are utilized by one or more pictures in a coded video sequence may be included in a sequence parameter set (SPS). Similarly, parameters that are utilized by one or more slices in a picture may be included in a picture parameter set (PPS), and other parameters that are specific to a single slice may be included in a slice header. Similarly, the indication of which parameter set(s) a particular layer is using at a given time may be provided at various coding levels.

Thanks to the support of reference picture resampling (RPR) in VVC, support of a bitstream containing multiple layers, e.g., two layers with standard definition (SD) and high definition (HD) resolutions in VVC can be designed without the need any additional signal-processing-level coding tool, as upsampling needed for spatial scalability support can just use the RPR upsampling filter. Nevertheless, high-level syntax changes (compared to not supporting scalability) are needed for scalability support. Scalability support is specified in VVC version 1. Different from the scalability supports in any earlier video coding standards, including in extensions of AVC and HEVC, the design of VVC scalability has been made friendly to single-layer decoder designs as much as possible. The decoding capability for multi-layer bitstreams are specified in a manner as if there were only a single layer in the bitstream. For example, the decoding capability, such as DPB size, is specified in a manner that is independent of the number of layers in the bitstream to be decoded. Basically, a decoder designed for single-layer bitstreams does not need much change to be able to decode multi-layer bitstreams. Compared to the designs of multi-layer extensions of AVC and HEVC, the hypertext transfer protocol live streaming (HLS) aspects have been significantly simplified at the sacrifice of some flexibilities. For example, an TRAP AU is required to contain a picture for each of the layers present in the CVS.

3.5. Viewport-Dependent 360° Video Streaming Based on Subpictures

In streaming of 360° video (also referred to as omnidirectional video), at any particular moment only a subset (i.e., the current viewport) of the entire omnidirectional video sphere would be rendered to the user, while the user can turn his/her head anytime to change the viewing orientation and consequently the current viewport. While it is desirable to have at least some lower-quality representation of the area not covered by the current viewport available at the client and ready to be rendered to the user just in case the user suddenly changes his/her viewing orientation to anywhere on the sphere, a high-quality representation of the omnidirectional video is only needed for the current viewport that is being rendered to the use right now. Splitting the high-quality representation of the entire omnidirectional video into subpictures at an appropriate granularity enables such an optimization. Using VVC, the two representations can be encoded as two layers that are independent from each other.

Figure 11:
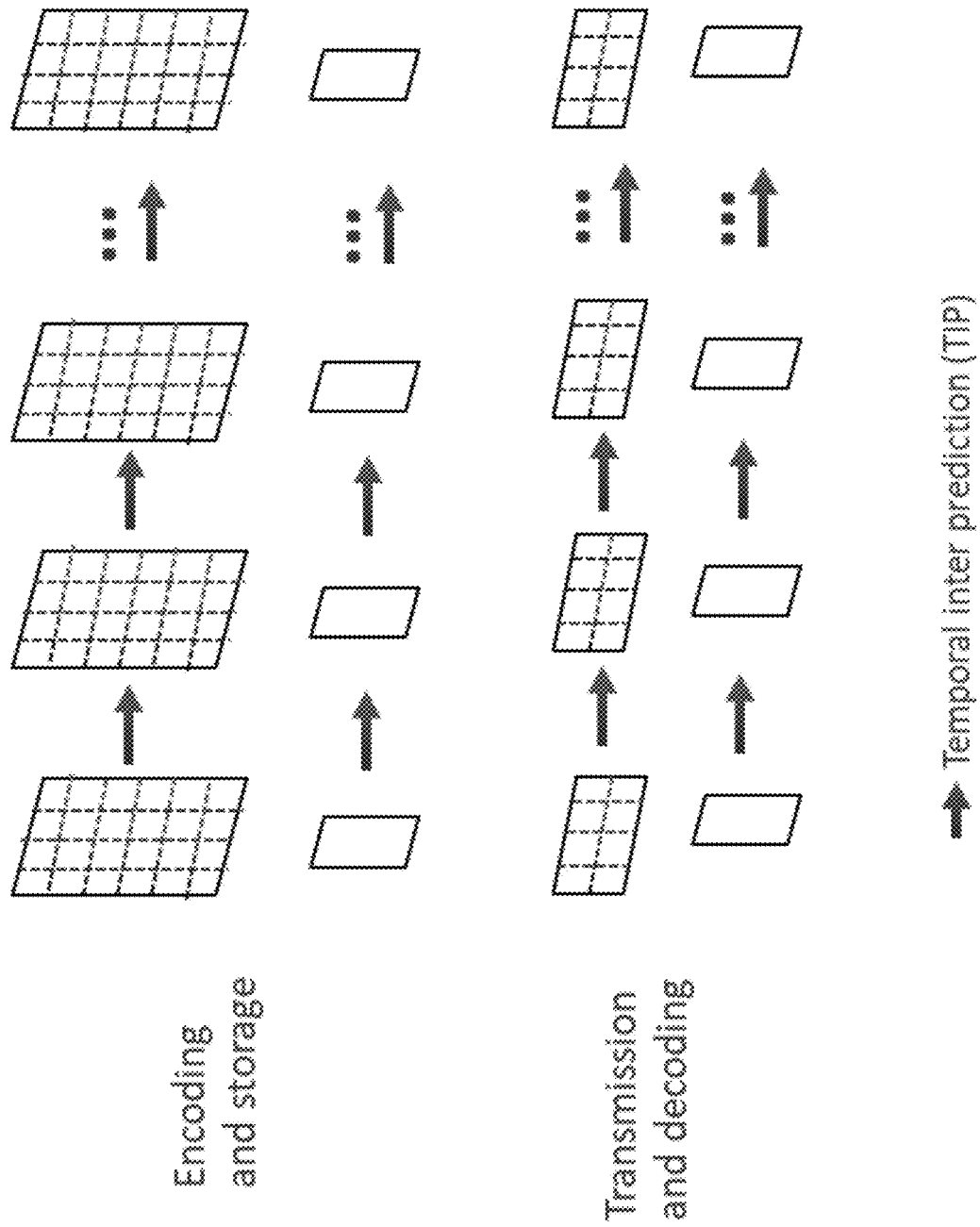
FIG. 11 shows an example of a typical subpicture-based viewport-dependent 360° video coding scheme.

A typical subpicture-based viewport-dependent 360° video delivery scheme is shown in FIG. 11, wherein a higher-resolution representation of the full video consists of subpictures, while a lower-resolution representation of the full video does not use subpictures and can be coded with less frequent random access points than the higher-resolution representation. The client receives the full video in the lower-resolution and for the higher-resolution video the client only receives and decodes the subpictures that cover the current viewport.

Figure 12:
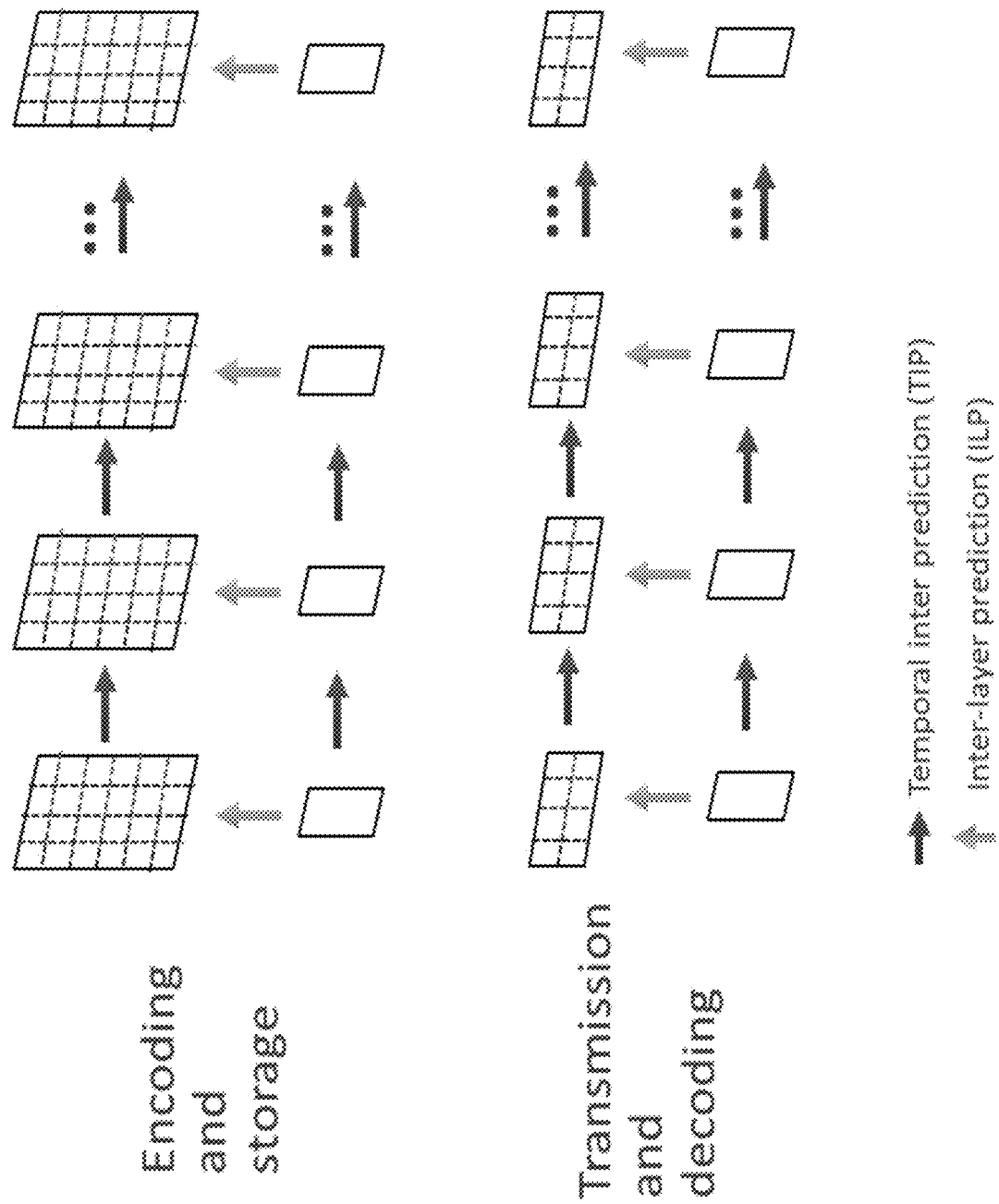
FIG. 12 shows a viewport-dependent 360° video coding scheme based on subpictures and spatial scalability.

The latest VVC draft specification also supports the improved 360° video coding scheme as shown in FIG. 12. The only difference compared to the approach shown in FIG. 11 is that inter-layer prediction (ILP) is applied for the approach shown in FIG. 12.

3.6. Parameter Sets

AVC, HEVC, and VVC specify parameter sets. The types of parameter sets include SPS, PPS, APS, and VPS. SPS and PPS are supported in all of AVC, HEVC, and VVC. VPS was introduced since HEVC and is included in both HEVC and VVC. APS was not included in AVC or HEVC but is included in the latest VVC draft text.

SPS was designed to carry sequence-level header information, and PPS was designed to carry infrequently changing picture-level header information. With SPS and PPS, infrequently changing information need not to be repeated for each sequence or picture, hence redundant signalling of this information can be avoided. Furthermore, the use of SPS and PPS enables out-of-band transmission of the important header information, thus not only avoiding the need for redundant transmissions but also improving error resilience.

VPS was introduced for carrying sequence-level header information that is common for all layers in multi-layer bitstreams.

APS was introduced for carrying such picture-level or slice-level information that needs quite some bits to code, can be shared by multiple pictures, and in a sequence there can be quite many different variations.

3.7. Specifying and Signalling of Nested SEI Messages for Subpicture Sequences in VVC In the latest VVC draft text, the specifying and signalling of nested SEI messages subpicture sequences in VVC are through the scalable nesting SEI message. A subpicture sequence is defined in the semantics of the subpicture level information (SLI) SEI message. A subpicture sequence can be extracted from a bitstream by applying the subpicture sub-bitstream extraction process specified in clause C.7 of VVC.

The syntax and semantics of the scalable nesting SEI message in the latest VVC draft text are as follows.

D.6.1 Scalable Nesting SEI Message Syntax

|  | Descriptor |
|---|---|
| scalable_nesting( payloadSize ) { |  |
|   sn_ols_flag | u(1) |
|   sn_subpic_flag | u(1) |
|   if( sn_ols_flag ) { |  |
|     sn_num_olss_minus1 | ue(v) |
|     for( i = 0; i <= sn_num_olss_minus1; i++ ) |  |
|       sn_ols_idx_delta_minus1[ i ] | ue(v) |
|   } else { |  |
|     sn_all_layers_flag | u(1) |
|     if( !sn_all_layers_flag ) { |  |
|       sn_num_layers_minus1 | ue(v) |
|       for( i = 1; i <= sn_num_layers_minus1; i++ ) |  |
|         sn_layer_id[ i ] | u(6) |
|     } |  |
|   } |  |
|   if( sn_subpic_flag ) { |  |
|     sn_num_subpics_minus1 | ue(v) |
|     sn_subpic_id_len_minus1 | ue(v) |
|     for( i = 0; i <= sn_num_subpics_minus1; i++ ) |  |
|       sn_subpic_id[ i ] | u(v) |
|   } |  |
|   sn_num_seis_minus1 | ue(v) |
|   while( !byte_aligned( ) ) |  |
|     sn_zero_bit /* equal to 0 */ | u(1) |
|   for( i = 0; i <= sn_num_seis_minus1; i++ ) |  |
|     sei_message( ) |  |
| } |  |

D.6.2 Scalable Nesting SEI Message Semantics

The scalable nesting SEI message provides a mechanism to associate SEI messages with specific OLSs or with specific layers and also associate SEI messages with specific sets of subpictures. A scalable nesting SEI message contains one or more SEI messages. The SEI messages contained in the scalable nesting SEI message are also referred to as the scalable-nested SEI messages. It is a requirement of bitstream conformance that the following restrictions apply on containing of SEI messages in a scalable nesting SEI message:

An SEI message that has payloadType equal to 132 (decoded picture hash) shall only be contained in a scalable nesting SEI message with sn_subpic_flag equal to 1.

An SEI message that has payloadType equal to 133 (scalable nesting) shall not be contained in a scalable nesting SEI message.

When a scalable nesting SEI message contains a BP, PT, or DUI SEI message, the scalable nesting SEI message shall not contain any other SEI message with payloadType not equal to 0 (BP), 1 (PT), or 130 (DUI).

It is a requirement of bitstream conformance that the following restriction applies on the value of the nal_unit_type of the SEI NAL unit containing a scalable nesting SEI message:

When a scalable nesting SEI message contains an SEI message that has payloadType equal to 0 (BP), 1 (PT), 130 (DUI), 145 (DRAP indication), or 168 (frame-field information), the SEI NAL unit containing the scalable nesting SEI message shall have nal_unit_type equal to PREFIX_SEI_NUT.

sn_ols_flag equal to 1 specifies that the scalable-nested SEI messages apply to specific OLSs.

sn_ols_flag equal to 0 specifies that the scalable-nested SEI messages apply to specific layers.

It is a requirement of bitstream conformance that the following restrictions apply on the value of sn_ols_flag:

When the scalable nesting SEI message contains an SEI message that has payloadType equal to 0 (BP), 1 (PT), or 130 (DUI), the value of sn_ols_flag shall be equal to 1.

When the scalable nesting SEI message contains an SEI message that has payloadType equal to a value in VclAssociatedSeiList, the value of sn_ols_flag shall be equal to 0.

sn_subpic_flag equal to 1 specifies that the scalable-nested SEI messages that apply to specified OLSs or layers apply only to specific subpictures of the specified OLSs or layers. sn_subpic_flag equal to 0 specifies that the scalable-nested SEI messages that apply to specific OLSs or layers apply to all subpictures of the specified OLSs or layers.

sn_num_olss_minus1 plus 1 specifies the number of OLSs to which the scalable-nested SEI messages apply. The value of sn_num_olss_minus1 shall be in the range of 0 to TotalNumOlss−1, inclusive.

sn_ols_idx_delta_minus1[i] is used to derive the variable NestingOlsIdx[i] that specifies the OLS index of the i-th OLS to which the scalable-nested SEI messages apply when sn_ols_flag is equal to 1. The value of sn_ols_idx_delta_minus1[i] shall be in the range of 0 to TotalNumOlss−2, inclusive, inclusive.

The variable NestingOlsIdx[i] is derived as follows:

```
if( i = = 0 )
    NestingOlsIdx[ i ] = sn_ols_idx_delta_minus1[ i ]    (D.4)
else
    NestingOlsIdx[ i ] = NestingOlsIdx[ i − 1 ] +
        sn_ols_idx_delta_minus1[ i ] + 1
``` sn_all_layers_flag equal to 1 specifies that the scalable-nested SEI messages apply to all layers that have nuh_layer_id greater than or equal to the nuh_layer_id of the current SEI NAL unit. sn_all_layers_flag equal to 0 specifies that the scalable-nested SEI messages may or may not apply to all layers that have nuh_layer_id greater than or equal to the nuh_layer_id of the current SEI NAL unit.

sn_num_layers_minus1 plus 1 specifies the number of layers to which the scalable-nested SEI messages apply. The value of sn_num_layers_minus1 shall be in the range of 0 to vps_max_layers_minus1−GeneralLayerIdx[nuh_layer_id], inclusive, where nuh_layer_id is the nuh_layer_id of the current SEI NAL unit.

sn_layer_id[i] specifies the nuh_layer_id value of the i-th layer to which the scalable-nested SEI messages apply when sn_all_layers_flag is equal to 0. The value of sn_layer_id[i] shall be greater than nuh_layer_id, where nuh_layer_id is the nuh_layer_id of the current SEI NAL unit.

When sn_ols_flag is equal to 0, the variable nestingNumLayers, specifying the number of layer to which the scalable-nested SEI messages apply, and the list nestingLayerId[i] for i in the range of 0 to nestingNumLayers−1, inclusive, specifying the list of nuh_layer_id value of the layers to which the scalable-nested SEI messages apply, are derived as follows, where nuh_layer_id is the nuh_layer_id of the current SEI NAL unit:

```
if( sn_all_layers_flag ) {
    nestingNumLayers =
    vps_max_layers_minus1 + 1 − GeneralLayerIdx[ nuh_layer_id ]
    for( i = 0; i < nestingNumLayers; i ++)
        nestingLayerId[ i ] = vps_layer_id[ GeneralLayerIdx
            [ nuh_layer_id ] + i ]
    (D.5)
} else {
    nestingNumLayers = sn_num_layers_minus1 + 1
    for( i = 0; i < nestingNumLayers; i ++)
        nestingLayerId[ i ] = ( i = = 0 ) ?
            nuh_layer_id : sn_layer_id[ i ]
}
``` sn_num_subpics_minus1 plus 1 specifies the number of subpictures to which the scalable-nested SEI messages apply. The value of sn_num_subpics_minus1 shall be less than or equal to the value of sps_num_subpics_minus1 in the SPS referred to by the pictures in the CLVS.

sn_subpic_id_len_minus1 plus 1 specifies the number of bits used to represent the syntax element sn_subpic_id[i]. The value of sn_subpic_id_len_minus1 shall be in the range of 0 to 15, inclusive. It is a requirement of bitstream conformance that the value of sn_subpic_id_len_minus1 shall be the same for all scalable nesting SEI messages that are present in a CLVS.

sn_subpic_id[i] indicates the i-th subpicture ID associated with the scalable-nested SEI messages. The length of the sn_subpic_id[i] syntax element is sn_subpic_id_len_minus1+1 bits. sn_num_seis_minus1 plus 1 specifies the number of scalable-nested SEI messages. The value of sn_num_seis_minus1 shall be in the range of 0 to 63, inclusive.

sn_zero_bit shall be equal to 0.

4. Technical Problems Solved by Disclosed Technical Solutions

The existing VVC design for specifying and signalling of nested SEI messages for subpictures and subpicture sequences, through the scalable nesting SEI message, has the following problems:

1) For associating a scalable-nested SEI message to one or more subpictures, the scalable nesting SEI message uses subpicture IDs. However, the persistency scope of a scalable-nested SEI message can be a number of consecutive AUs, while the subpicture ID of the subpictures with a particular subpicture index in a layer can change within a CLVS. Therefore, instead of using subpicture IDs, subpicture indices should be used in the scalable nesting SEI message.

2) Filler payload SEI messages, when present, need to be removed from the output bitstream in the subpicture sub-bitstream extraction process when the associated subpictures are removed. However, when it is possible to include filler payload SEI messages in a scalable nesting SEI message, the removal of filler payload SEI messages in the subpicture sub-bitstream extraction process would sometimes need to extract some scalable-nested SEI messages from a scalable nesting SEI message.

3) Since the SLI SEI message applies to OLSs, like the other three HRD related SEI messages (i.e., the BP/PT/DUI SEI messages), when SLI SEI messages are scalable-nested, the value of sn_ols_flag need to be equal to 1. Furthermore, since the SLI SEI message specifies information for all subpictures in the pictures in the OLSs to which the SLI SEI message applies, it does not make sense for the value of sn_subpic_flag to be equal to 1 for a scalable nesting SEI message containing SLI SEI messages.

4) There lacks a constraint to require that when a scalable nesting SEI message contains a BP, PT, DUI, or SLI SEI message, the scalable nesting SEI message shall not contain any other SEI message with payloadType not equal to 0 (BP), 1 (PT), 130 (DUI), or 203 (SLI).

5) It is specified that when a scalable nesting SEI message contains an SEI message that has payloadType equal to 0 (BP), 1 (PT), 130 (DUI), 145 (DRAP indication), or 168 (frame-field information), the SEI NAL unit containing the scalable nesting SEI message shall have nal_unit_type equal to PREFIX_SEI_NUT. However, when nesting many other SEI messages, the value of the scalable nesting SEI message shall also have nal_unit_type equal to PREFIX_SEI_NUT.

6) There lacks a constraint that, when a scalable nesting SEI message contains an SEI message that has payloadType equal to 132 (decoded picture harsh), the SEI NAL unit containing the scalable nesting SEI message shall have nal_unit_type equal to SUFFIX_SEI_NUT.

7) The semantics of sn_num_subpics_minus1 and sn_subpic_idx[i] need to be specified in a way such that the syntax elements are about the subpictures of the layers with multiple subpictures per picture, to be able to support cases wherein an OLS has some layers with multiple subpictures per picture and some other layers with a single subpicture per picture.

5. A Listing of Solutions and Embodiments

To solve the above problems, and others, methods as summarized below are disclosed. The solution items should be considered as examples to explain the general concepts and should not be interpreted in a narrow way. Furthermore, these items can be applied individually or combined in any manner.

1) To solve the 1st problem, use subpicture indices (instead of using subpicture IDs) for associating subpictures to scalable-nested SEI messages in the scalable nesting SEI message.
   a. In one example, change the syntax element sn_subpic_id[i] to sn_subpic_idx[i], and consequently, remove the sn_subpic_id_len_minus1 syntax element.

2) To solve the 2nd problem, it is prohibited for filler payload SEI messages to be scalable-nested, i.e., contained in a scalable nesting SEI message.

3) To solve the 3rd problem, add a constraint such that, when a scalable nesting SEI message contains one or more SLI SEI messages, the value of sn_ols_flag shall be equal to 1.
   a. In one example, furthermore, or alternatively, add a constraint such that, when a scalable nesting SEI message contains one or more SLI SEI messages, the value of sn_subpic_flag shall be equal to 0.

4) To solve the 4th problem, it is required that, that when a scalable nesting SEI message contains a BP, PT, DUI, or SLI SEI message, the scalable nesting SEI message shall not contain any other SEI message with payloadType not equal to 0 (BP), 1 (PT), 130 (DUI), or 203 (SLI).

5) To solve the 5th problem, it is specified that when a scalable nesting SEI message contains an SEI message that has payloadType not equal to 3 (filler payload) or 132 (decoded picture hash), the SEI NAL unit containing the scalable nesting SEI message shall have nal_unit_type equal to PREFIX_SEI_NUT.

6) To solve the 6th problem, add a constraint such that when a scalable nesting SEI message contains an SEI message that has payloadType equal to 132 (decoded picture hash), the SEI NAL unit containing the scalable nesting SEI message shall have nal_unit_type equal to SUFFIX_SEI_NUT.

7) To solve the 7th problem, the semantics of sn_num_subpics_minus1 and sn_subpic_idx[i] are specified in a way such that the syntax elements specify information about the subpictures of the layers that have multiple subpictures per picture.

6. Embodiments

Below are some example embodiments for some of the invention aspects summarized above in this Section, which can be applied to the VVC specification. The changed texts are based on the latest VVC text in JVET-50152-v5. Most relevant parts that have been added or modified are indicated in bold italicized text, and some of the deleted parts are marked by open and close double square brackets (e.g., [[ ]]) with deleted text in between the double brackets.

6.1. Embodiment 1

This embodiment is for items 1 to 5 and some of their sub-items.

D.6.1 Scalable Nesting SEI Message Syntax

|  | Descriptor |
|---|---|
| scalable_nesting( payloadSize ) { |  |
|     sn_ols_flag | u(1) |
|     sn_subpic_flag | u(1) |
|     f( sn_ols_flag ) { |  |
|         sn_num_olss_minus1 | ue(v) |
|         for( i = 0; i <= sn_num_olss_minus1; i++ ) |  |
|             sn_ols_idx_delta_minus1[ i ] | ue(v) |
|     } else { |  |
|         sn_all_layers_flag | u(1) |
|         if( ! sn_all_layers_flag ) { |  |
|             sn_num_layers_minus1 | ue(v) |
|             for( i = 1; i <= sn_num_layers_minus1; i++ ) |  |
|                 sn_layer_id[ i ] | u(6) |
|         } |  |
|     } |  |
|     if( sn_subpic_flag ) { |  |
|         sn_num_subpics_minus1 | ue(v) |
| [[        sn_subpic_id_len_minus1]] | [[ue(v)]] |
|         for( i = 0; i <= sn_num_subpics_minus1; i++ ) |  |
|             sn_subpic_idx[ i ] | ue(v) |
|     } |  |
|     sn_num_seis_minus1 | ue(v) |
|     while( !byte_aligned( ) ) |  |
|         sn_zero_bit /* equal to 0 */ | u(1) |
|     for( i = 0; i <= sn_num_seis_minus1; i++ ) |  |
|         sei_message( ) |  |
| } |  |

D.6.2 Scalable Nesting SEI Message Semantics

The scalable nesting SEI message provides a mechanism to associate SEI messages with specific OLSs or with specific layers as well as to associate SEI messages with specific sets of subpictures. A scalable nesting SEI message contains one or more SEI messages. The SEI messages contained in the scalable nesting SEI message are also referred to as the scalable-nested SEI messages. It is a requirement of bitstream conformance that the following restrictions apply on containing of SEI messages in a scalable nesting SEI message:

[[An SEI message that has payloadType equal to 132 (decoded picture hash) shall only be contained in a scalable nesting SEI message with sn_subpic_flag equal to 1.]]

An SEI message that has payloadType equal to 3 (filler payload) or 133 (scalable nesting) shall not be contained in a scalable nesting SEI message.

When a scalable nesting SEI message contains a BP, PT,[[ or]] DUI, or SLI SEI message, the scalable nesting SEI message shall not contain any other SEI message with payloadType not equal to 0 (BP), 1 (PT),[[ or]] 130 (DUI), or 203 (SLI).

It is a requirement of bitstream conformance that the following restriction applies on the value of the nal_unit_type of the SEI NAL unit containing a scalable nesting SEI message:

When a scalable nesting SEI message contains an SEI message that has payloadType not equal to 3 (filler payload) or 132 (decoded picture harsh) [[equal to 0 (BP), 1 (PT), 130 (DUI), 145 (DRAP indication), or 168 (frame-field information)]], the SEI NAL unit containing the scalable nesting SEI message shall have nal_unit_type equal to PREFIX_SEI_NUT.

When a scalable nesting SEI message contains an SEI message that has payloadType equal to 132 (decoded picture harsh), the SEI NAL unit containing the scalable nesting SEI message shall have nal_unit_type equal to SUFFIX_SEI_NUT.

sn_ols_flag equal to 1 specifies that the scalable-nested SEI messages apply to specific OLSs. sn_ols_flag equal to 0 specifies that the scalable-nested SEI messages apply to specific layers. It is a requirement of bitstream conformance that the following restrictions apply on the value of sn_ols_flag:

When the scalable nesting SEI message contains an SEI message that has payloadType equal to 0 (BP), 1 (PT), [[or]] 130 (DUI), or 203 (SLI), the value of sn_ols_flag shall be equal to 1.

When the scalable nesting SEI message contains an SEI message that has payloadType equal to a value in NestingForLayersSeiList but not equal to 203 (SLI), the value of sn_ols_flag shall be equal to 0.

sn_subpic_flag equal to 1 specifies that the scalable-nested SEI messages that apply to specified OLSs or layers apply only to specific subpictures of the specified OLSs or layers. sn_subpic_flag equal to 0 specifies that the scalable-nested SEI messages that apply to specific OLSs or layers apply to all subpictures of the specified OLSs or layers.

It is a requirement of bitstream conformance that the following restrictions apply on the value of sn_subpic_flag:

When the scalable nesting SEI message contains an SEI message that has payloadType equal to 132 (decoded picture hash), the value of sn_subpic_flag shall be equal to 1.

When the scalable nesting SEI message contains an SEI message that has payloadType equal to 203 (SLI), the value of sn_subpic_flag shall be equal to 0.

sn_num_olss_minus1 plus 1 specifies the number of OLSs to which the scalable-nested SEI messages apply. The value of sn_num_olss_minus1 shall be in the range of 0 to TotalNumOlss−1, inclusive.

sn_ols_idx_delta_minus1[i] is used to derive the variable NestingOlsIdx[i] that specifies the OLS index of the i-th OLS to which the scalable-nested SEI messages apply when sn_ols_flag is equal to 1. The value of sn_ols_idx_delta_minus1[i] shall be in the range of 0 to TotalNumOlss−2, inclusive, inclusive.

The variable NestingOlsIdx[i] is derived as follows:
if(i==0)
    NestingOlsIdx[i]=sn_ols_idx_delta_minus1[i] (D.4)
else
    NestingOlsIdx[i]=NestingOlsIdx[i−1]+sn_ols_idx_delta_minus1[i]+1 sn_all_layers_flag equal to 1 specifies that the scalable-nested SEI messages apply to all layers that have nuh_layer_id greater than or equal to the nuh_layer_id of the current SEI NAL unit. sn_all_layers_flag equal to 0 specifies that the scalable-nested SEI messages may or may not apply to all layers that have nuh_layer_id greater than or equal to the nuh_layer_id of the current SEI NAL unit.

sn_num_layers_minus1 plus 1 specifies the number of layers to which the scalable-nested SEI messages apply. The value of sn_num_layers_minus1 shall be in the range of 0 to vps_max_layers_minus1−GeneralLayerIdx[nuh_layer_id], inclusive, where nuh_layer_id is the nuh_layer_id of the current SEI NAL unit.

sn_layer_id[i] specifies the nuh_layer_id value of the i-th layer to which the scalable-nested SEI messages apply when sn_all_layers_flag is equal to 0. The value of sn_layer_id[i] shall be greater than nuh_layer_id, where nuh_layer_id is the nuh_layer_id of the current SEI NAL unit.

When sn_ols_flag is equal to 0, the variable NestingNumLayers, specifying the number of layer to which the scalable-nested SEI messages apply, and the list NestingLayerId[i] for i in the range of 0 to NestingNumLayers−1, inclusive, specifying the list of nuh_layer_id value of the layers to which the scalable-nested SEI messages apply, are derived as follows, where nuh_layer_id is the nuh_layer_id of the current SEI NAL unit:

```
if( sn_all_layers_flag ) {
    NestingNumLayers =
  vps_max_layers_minus1 + 1 − GeneralLayerIdx[ nuh_layer_id ]
    for( i = 0; i < NestingNumLayers; i ++)
       NestingLayerId[ i ] = vps_layer_id[ GeneralLayerIdx
       [ nuh_layer_id ] + i ]
      (D.5)
} else {
    NestingNumLayers = sn_num_layers_minus1 + 1
    for( i = 0; i < NestingNumLayers; i ++)
       NestingLayerId[ i ] = ( i = = 0 ) ?
       nuh_layer_id : sn_layer_id[ i ]
}
```

Among the layers in the OLSs (when sn_ols_flag is equal to 1) to which the scalable-nested SEI messages apply, or among the layers (when sn_ols_flag is equal to 0) to which the scalable-nested SEI messages apply, those for which the referenced SPSs have sps_num_subpics_minus1 greater than 0 are referred to as the multiSubpicLayers.

sn_num_subpics_minus1 plus 1 specifies the number of subpictures in each picture in the multiSubpicLayers [[to which the scalable-nested SEI messages apply]]. The value of sn_num_subpics_minus1 shall be less than or equal to the value of sps_num_subpics_minus1 in the SPSs referred to by the pictures in the multiSubpicLayers [[CLVS]].

[[sn_subpic_id_len_minus1 plus 1 specifies the number of bits used to represent the syntax element sn_subpic_id[i]. The value of sn_subpic_id_len_minus1 shall be in the range of 0 to 15, inclusive.

It is a requirement of bitstream conformance that the value of sn_subpic_id_len_minus1 shall be the same for all scalable nesting SEI messages that are present in a CLVS.]]

sn_subpic_idx[i][[indicates]] specifies the subpicture index of the i-th subpicture [[ID associated with the scalable-nested SEI messages]] in each picture in the multiSubpicLayers. The value of sn_subpic_idx[i] shall be less than or equal to the value of sps_num_subpics_minus1 in the SPSs referred to by the pictures in the multiSubpicLayers. [[The length of the sn_subpic_id[i] syntax element is sn_subpic_id_len_minus1+1 bits.]] The scalable-nested SEI messages also apply to the single subpicture in each picture in the layers that are not in the multiSubpicLayers but are among the layers in the OLSs (when sn_ols_flag is equal to 1) to which the scalable-nested SEI messages apply or among the layers (when sn_ols_flag is equal to 0) to which the scalable-nested SEI messages apply.

sn_num_seis_minus1 plus 1 specifies the number of scalable-nested SEI messages. The value of sn_num_seis_minus1 shall be in the range of 0 to 63, inclusive.

sn_zero_bit shall be equal to 0.

Figure 5:
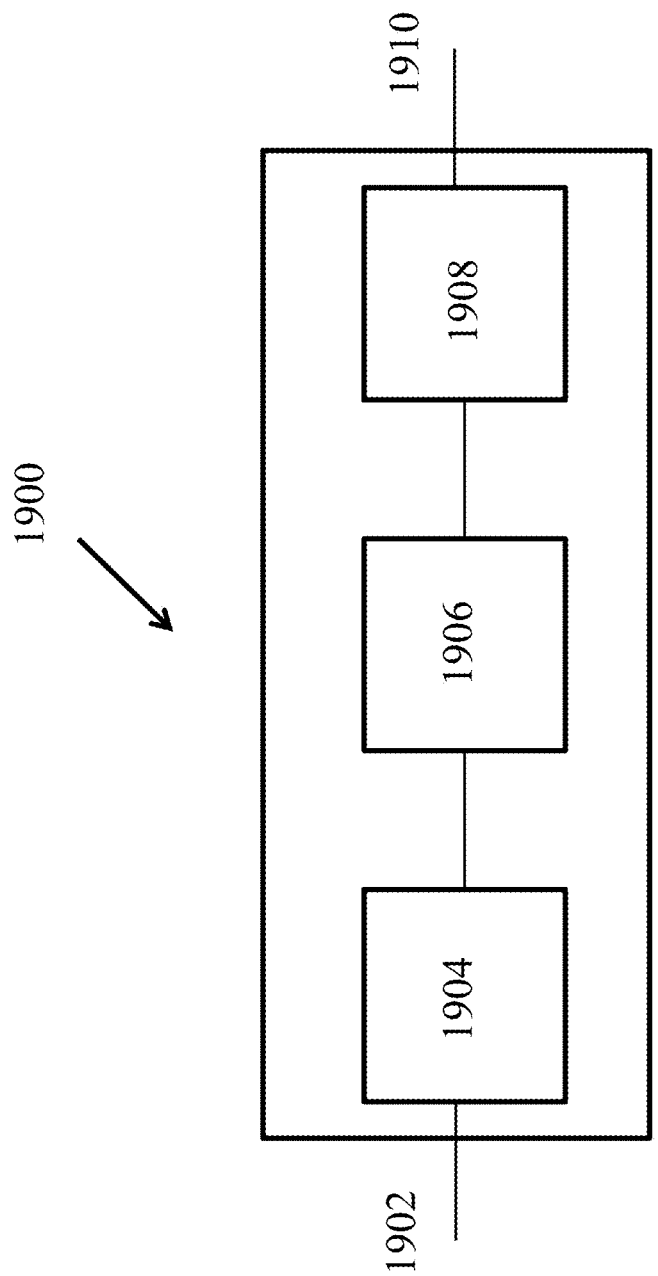
FIG. 5 is a block diagram of an example video processing system.

FIG. 5 is a block diagram showing an example video processing system 1900 in which various embodiments disclosed herein may be implemented. Various embodiments may include some or all of the components of the system 1900. The system 1900 may include input 1902 for receiving video content. The video content may be received in a raw or uncompressed format, e.g., 8- or 10-bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1900 may include a coding component 1904 that may implement the various coding or encoding methods described in the present disclosure. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or DisplayPort, and so on. Examples of storage interfaces include serial advanced technology attachment (SATA), peripheral component interconnect (PCI), integrated drive electronics (IDE) interface, and the like. The embodiments described in the present disclosure may be embodied in various electronic devices such as mobile phones, laptops, smartphones or other devices that are capable of performing digital data processing and/or video display.

Figure 6:
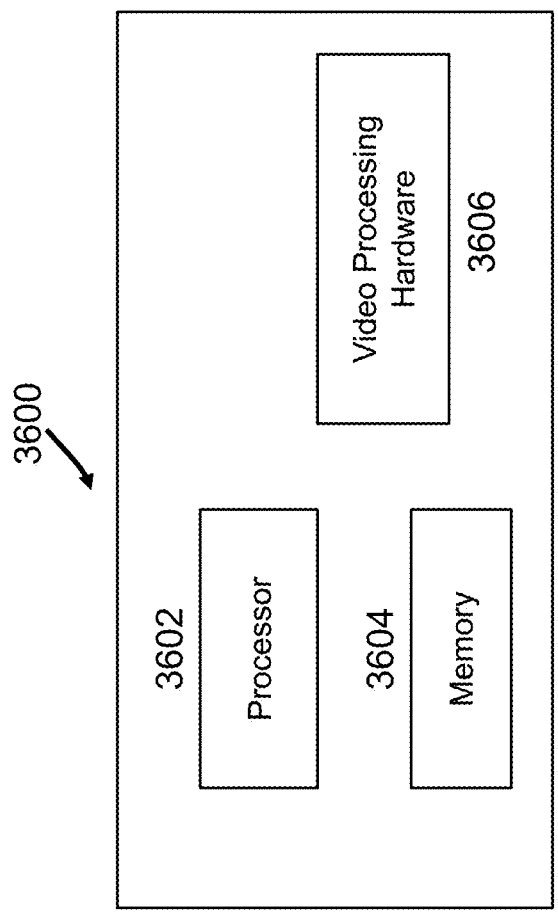
FIG. 6 is a block diagram of a video processing apparatus.
Figure 7:
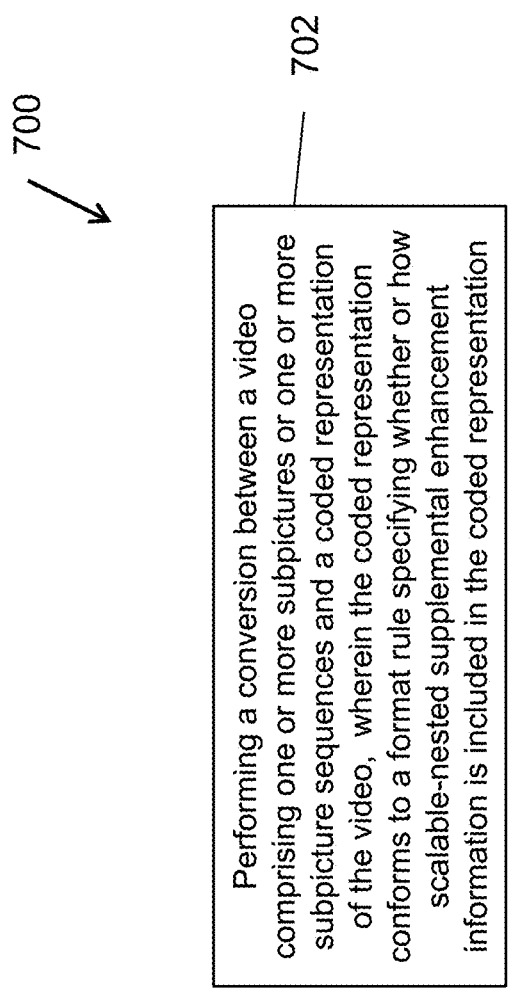
FIG. 7 is a flowchart for an example method of video processing.

FIG. 6 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present disclosure. The memory (memories) 3604 may be used for storing data and code used for implementing the methods and embodiments described herein. The video processing hardware 3606 may be used to implement, in hardware circuitry, some embodiments described in the present disclosure.

Figure 8:
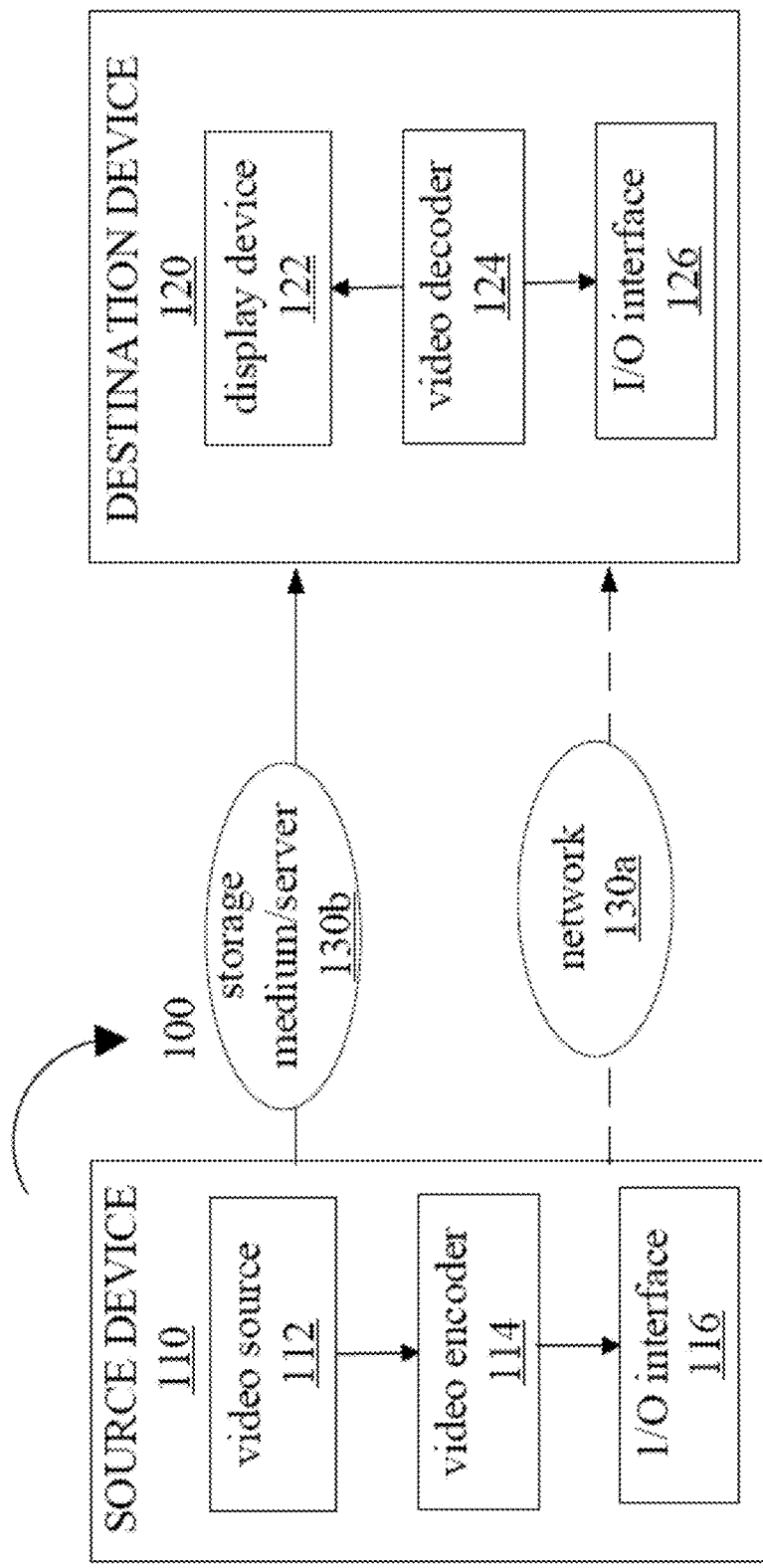
FIG. 8 is a block diagram that illustrates a video coding system in accordance with some embodiments of the present disclosure.

FIG. 8 is a block diagram that illustrates an example video coding system 100 that may utilize the embodiments of this disclosure.

As shown in FIG. 8, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the HEVC standard, VVC standard, and other current and/or further standards.

Figure 9:
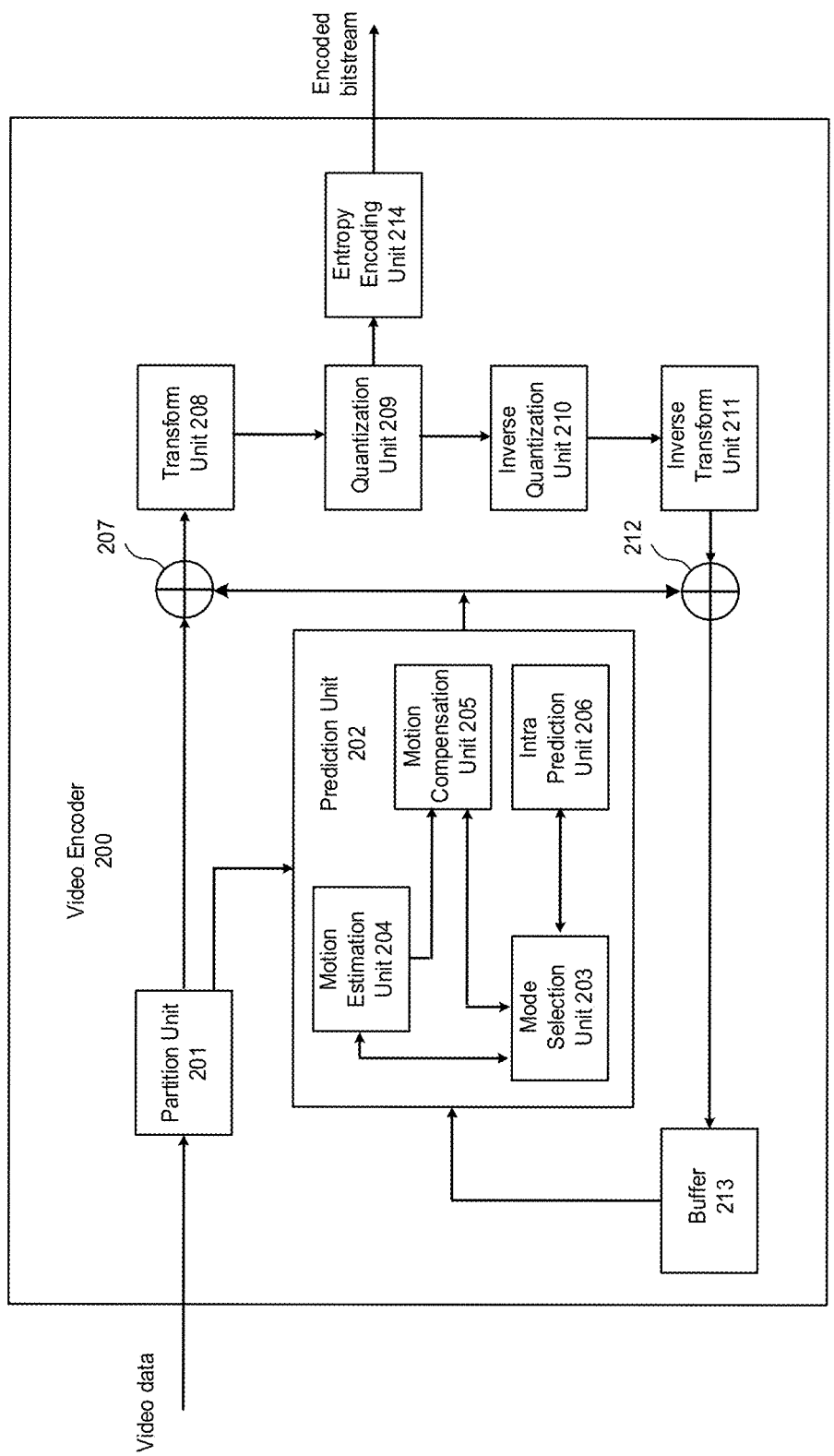
FIG. 9 is a block diagram that illustrates an encoder in accordance with some embodiments of the present disclosure.

FIG. 9 is a block diagram illustrating an example of video encoder 200, which may be video encoder 114 in the system 100 illustrated in FIG. 8.

Video encoder 200 may be configured to perform any or all of the embodiments of this disclosure. In the example of FIG. 9, video encoder 200 includes a plurality of functional components. The embodiments described in this disclosure may be shared among the various components of video encoder 200. In some examples, a processor may be configured to perform any or all of the embodiments described in this disclosure.

The functional components of video encoder 200 may include a partition unit 201, a prediction unit 202 which may include a mode select unit 203, a motion estimation unit 204, a motion compensation unit 205, and an intra prediction unit 206; a residual generation unit 207; a transform unit 208; a quantization unit 209; an inverse quantization unit 210; an inverse transform unit 211; a reconstruction unit 212; a buffer 213; and an entropy encoding unit 214.

In other examples, video encoder 200 may include more, fewer, or different functional components. In an example, prediction unit 202 may include an intra block copy (IBC) unit. The IBC unit may perform prediction in an IBC mode in which at least one reference picture is a picture where the current video block is located.

Furthermore, some components, such as motion estimation unit 204 and motion compensation unit 205 may be highly integrated, but are represented in the example of FIG. 9 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some examples, mode select unit 203 may select a combination of intra and inter prediction (CIIP) mode in which the prediction is based on an inter prediction signal and an intra prediction signal. Mode select unit 203 may also select a resolution for a motion vector (e.g., a sub-pixel or integer pixel precision) for the block in the case of inter prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signalling techniques that may be implemented by video encoder 200 include advanced motion vector prediction (AMVP) and merge mode signalling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 10:
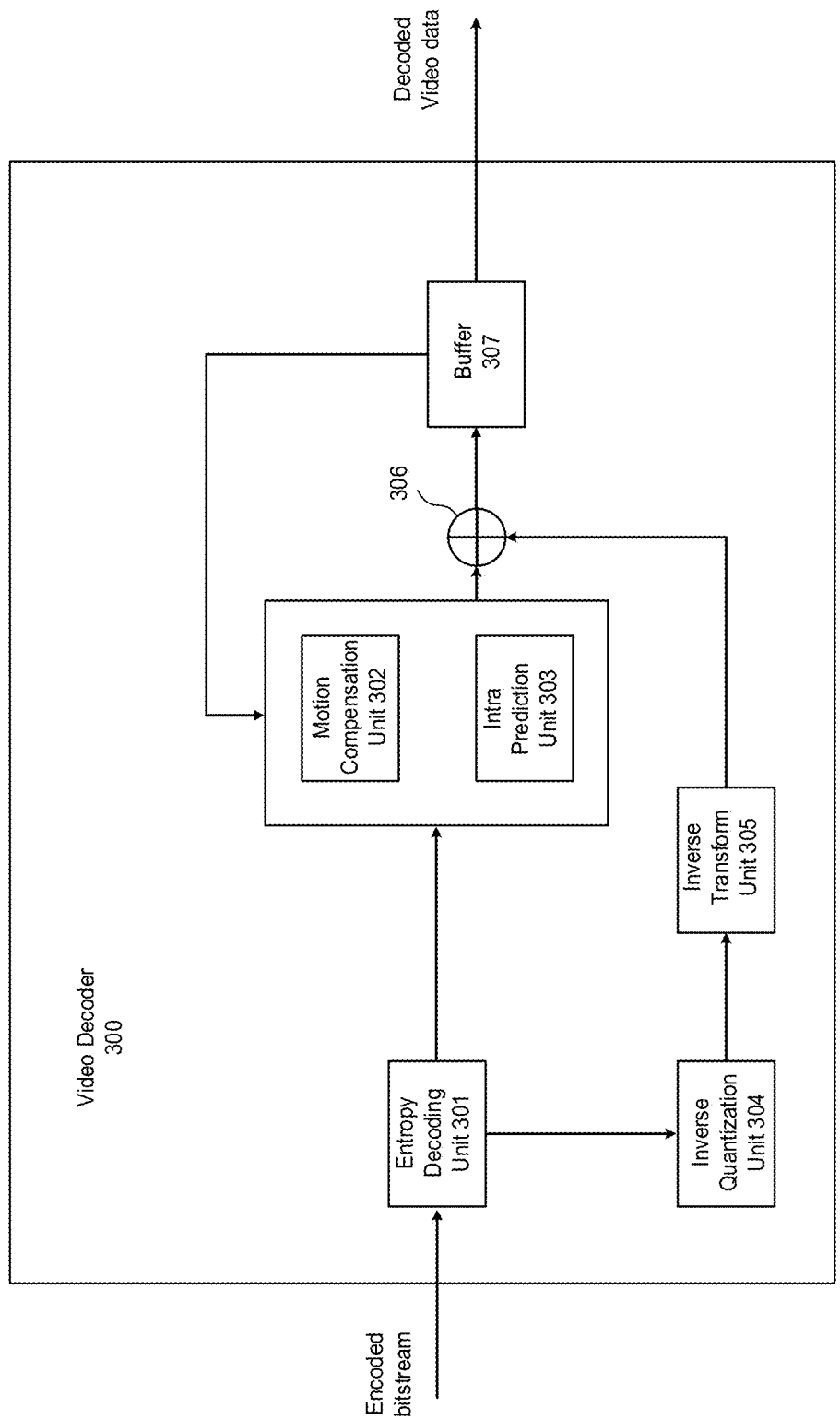
FIG. 10 is a block diagram that illustrates a decoder in accordance with some embodiments of the present disclosure.

FIG. 10 is a block diagram illustrating an example of video decoder 300 which may be video decoder 124 in the system 100 illustrated in FIG. 8.

The video decoder 300 may be configured to perform any or all of the embodiments of this disclosure. In the example of FIG. 10, the video decoder 300 includes a plurality of functional components. The embodiments described in this disclosure may be shared among the various components of the video decoder 300. In some examples, a processor may be configured to perform any or all of the embodiments described in this disclosure.

In the example of FIG. 10, video decoder 300 includes an entropy decoding unit 301, a motion compensation unit 302, an intra prediction unit 303, an inverse quantization unit 304, an inverse transform unit 305, a reconstruction unit 306, and a buffer 307. Video decoder 300 may, in some examples, perform a decoding pass generally reciprocal to the encoding pass described with respect to video encoder 200 (FIG. 9).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 304 inverse quantizes, i.e., de-quantizes, the quantized video block coefficients provided in the bitstream and decoded by entropy decoding unit 301. Inverse transform unit 305 applies an inverse transform.

Reconstruction unit 306 may sum the residual blocks with the corresponding prediction blocks generated by motion compensation unit 302 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra prediction and also produces decoded video for presentation on a display device.

A listing of solutions preferred by some embodiments is provided next.

The following solutions show example embodiments discussed in the previous section (e.g., all items).

1. A video processing method, comprising: performing a conversion between a video comprising one or more sub-pictures or one or more subpicture sequences and a coded representation of the video, wherein the coded representation conforms to a format rule specifying whether or how scalable-nested supplemental enhancement information (SEI) is included in the coded representation.

The following solutions show example embodiments discussed in the previous section (e.g., item 1).

2. The method of solution 1, wherein the format rule specifies that the coded representation uses subpicture indices to associate subpictures to corresponding scalable-nested SEI information.

The following solutions show example embodiments discussed in the previous section (e.g., item 2).

3. The method of any of solutions 1-2, wherein the format rule disallows use of filter payload SEI messages in a scalable-nested manner.

The following solutions show example embodiments discussed in the previous section (e.g., item 3).

4. The method of any of solutions 1-3, wherein the format rule specifies that, for a scalable-nested SEI message that includes one or more subpicture level information SEI messages, a flag is included in the coded representation for indicating a presence of the one or more subpicture level information SEI messages.

The following solutions show example embodiments discussed in the previous section (e.g., item 4).

5. The method of any of solutions 1-4, wherein the format rule disables inclusion of nested SEI messages of a payload of a certain type in a scalable SEI message containing a message of the certain type.

The following solutions show example embodiments discussed in the previous section (e.g., item 5).

6. The method of any of solutions 1-5, wherein the format rule specifies that an SEI message that is not of a filler payload type or a decoded picture hash type is required to have a specific network abstraction layer unit type.

The following solutions show example embodiments discussed in the previous section (e.g., item 6).

7. The method of any of solutions 1-6, wherein the format rule specifies that an SEI message that is of a decoded picture hash type is required to have a specific network abstraction layer unit type.

The following solutions show example embodiments discussed in the previous section (e.g., item 7).

8. The method of any of solutions 1-7, wherein the format rule specifies that the syntax elements specify information about the subpictures of the layers that have multiple subpictures per picture.

9. The method of any of solutions 1 to 8, wherein the conversion comprises encoding the video into the coded representation.

10. The method of any of solutions 1 to 8, wherein the conversion comprises decoding the coded representation to generate pixel values of the video.

11. A video decoding apparatus comprising a processor configured to implement a method recited in one or more of solutions 1 to 10.

12. A video encoding apparatus comprising a processor configured to implement a method recited in one or more of solutions 1 to 10.

13. A computer program product having computer code stored thereon, the code, when executed by a processor, causes the processor to implement a method recited in any of solutions 1 to 10.

14. A method, apparatus or system described in the present disclosure.

In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

Figure 13:
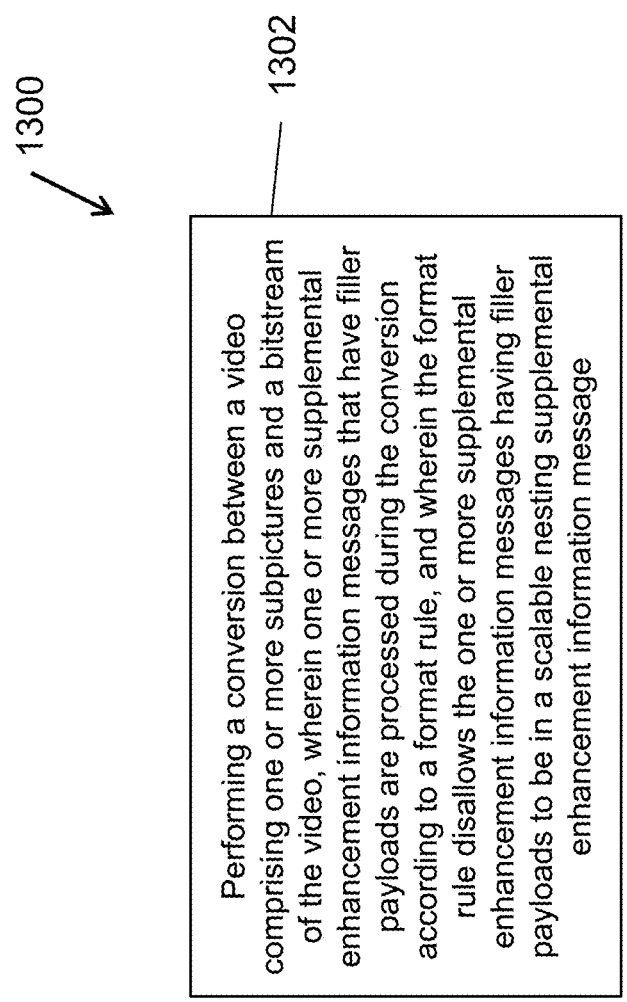
FIGS. 13 to 19 are flowcharts for example methods of processing video data.

FIG. 13 is a flowchart for an example method 1300 of processing video data. Operation 1302 includes performing a conversion between a video comprising one or more subpictures and a bitstream of the video, wherein one or more supplemental enhancement information messages that have filler payloads are processed during the conversion according to a format rule, and wherein the format rule disallows the one or more supplemental enhancement information messages having filler payloads to be in a scalable nesting supplemental enhancement information message.

In some embodiments of method 1300, the one or more supplemental enhancement information messages that have filler payloads include a payload type that has a value equal to 3. In some embodiments of method 1300, the format rule disallows one or more second supplemental enhancement information messages having scalable nesting to be in a scalable nesting supplemental enhancement information message.

Figure 14:
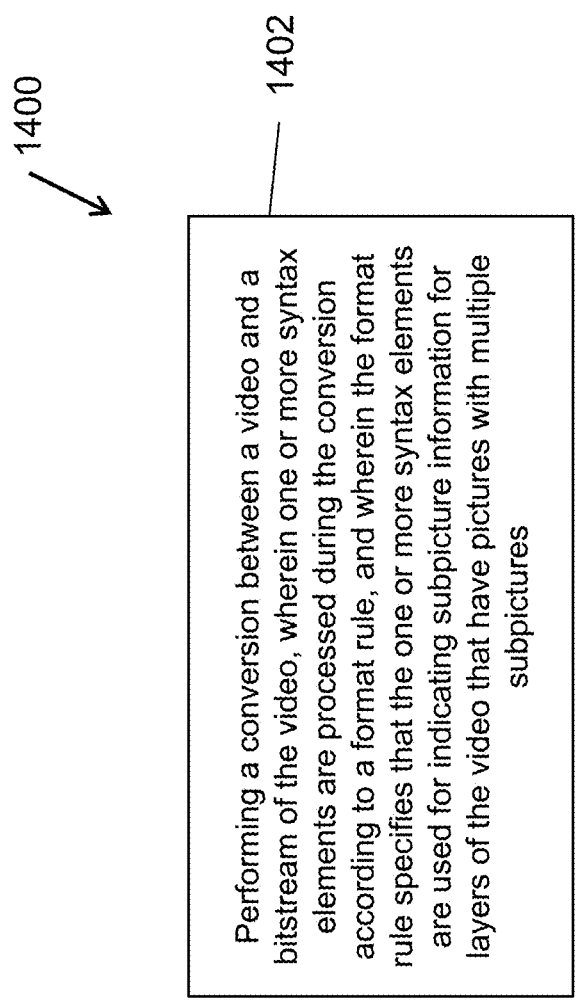

FIG. 14 is a flowchart for an example method 1400 of processing video data. Operation 1402 includes performing a conversion between a video and a bitstream of the video, wherein one or more syntax elements are processed during the conversion according to a format rule, and wherein the format rule specifies that the one or more syntax elements are used for indicating subpicture information for layers of the video that have pictures with multiple subpictures.

In some embodiments of method 1400, the one or more syntax elements include a first syntax element, and wherein a value of the first syntax element plus 1 specifies a number of subpictures in the pictures with multiple subpictures. In some embodiments of method 1400, the value of the first syntax element is less than or equal to a value of a second syntax element in a sequence parameter set referred to by pictures in multiple subpicture layers. In some embodiments of method 1400, the one or more syntax elements include a third syntax element, and wherein the third syntax element indicates a subpicture index of an i-th subpicture in each picture in the pictures with multiple subpictures. In some embodiments of method 1400, the first syntax element is labeled as sn_num_subpics_minus1. In some embodiments of method 1400, the third syntax element is labeled as sn_subpic_idx[i].

Figure 15:
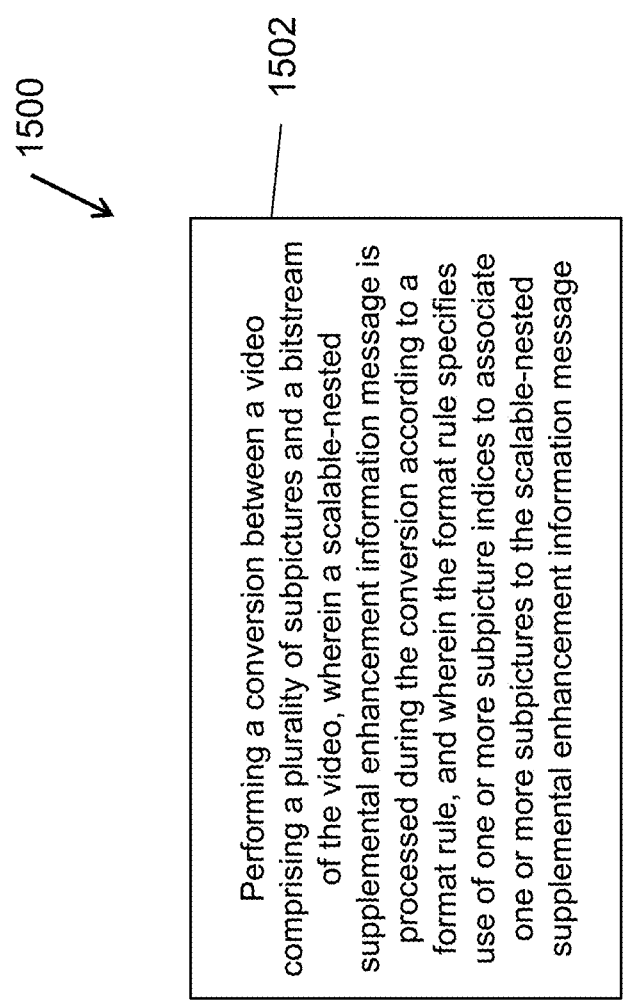

FIG. 15 is a flowchart for an example method 1500 of processing video data. Operation 1502 includes performing a conversion between a video comprising a plurality of subpictures and a bitstream of the video, wherein a scalable-nested supplemental enhancement information message is processed during the conversion according to a format rule, and wherein the format rule specifies use of one or more subpicture indices to associate one or more subpictures to the scalable-nested supplemental enhancement information message.

In some embodiments of method 1500, the format rule disallows use of one or more subpicture identifiers to associate the one or more subpictures to the scalable-nested supplemental enhancement information message. In some embodiments of method 1500, the format rule replaces a first syntax element with a second syntax element in the scalable-nested supplemental enhancement information message, the format rule removes a third syntax element from the scalable-nested supplemental enhancement information message, the first syntax element indicates the a subpicture identifier of an i-th subpicture in each picture in one or more video layers, the second syntax element indicates a subpicture index of an i-th subpicture in each picture in the one or more video layers, and the third syntax element plus 1 specifies a number of bits used to represent the first syntax element.

Figure 16:
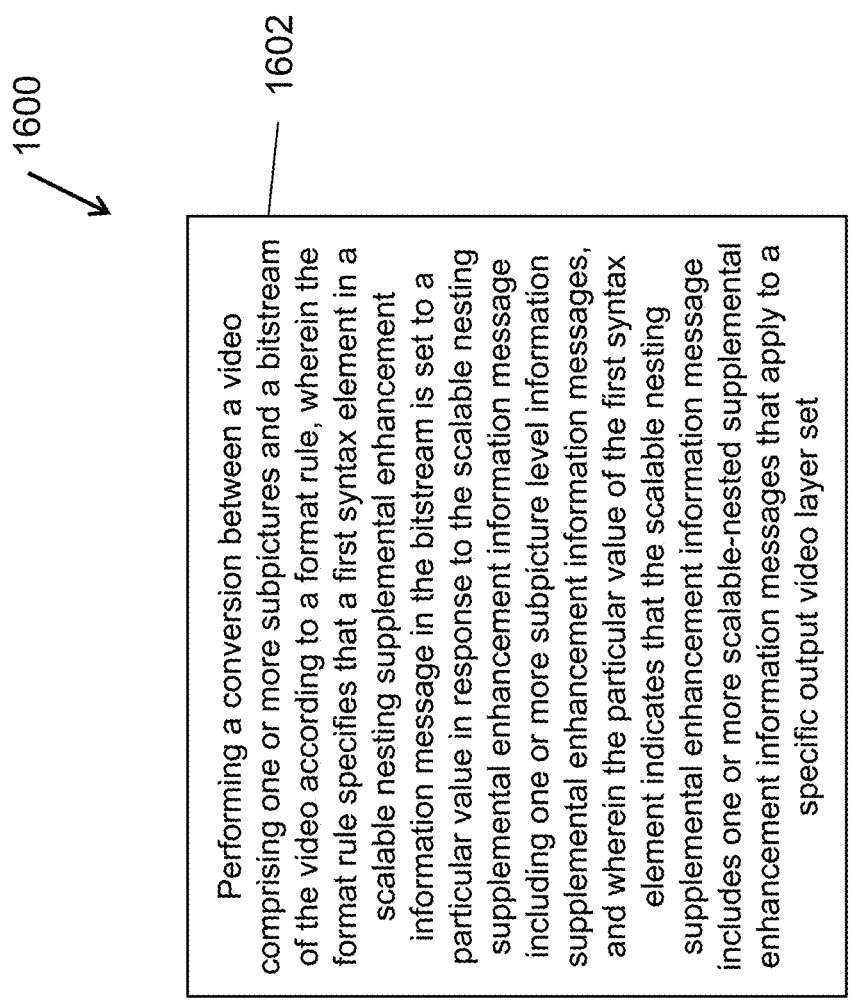

FIG. 16 is a flowchart for an example method 1600 of processing video data. Operation 1602 includes performing a conversion between a video comprising one or more subpictures and a bitstream of the video according to a format rule, wherein the format rule specifies that a first syntax element in a scalable nesting supplemental enhancement information message in the bitstream is set to a particular value in response to the scalable nesting supplemental enhancement information message including one or more subpicture level information supplemental enhancement information messages, and wherein the particular value of the first syntax element indicates that the scalable nesting supplemental enhancement information message includes one or more scalable-nested supplemental enhancement information messages that apply to a specific output video layer set.

In some embodiments of method 1600, the format rule that specifies that a value of a second syntax element in the bitstream is equal to 0 in response to the scalable nesting supplemental enhancement information message including the one or more subpicture level information supplemental enhancement information messages, and the value of the second syntax element being equal to 0 specifies that the scalable nesting supplemental enhancement information message includes the one or more scalable-nested supplemental enhancement information messages that apply to one or more output video layer sets or one or more video layers apply to all subpictures of the one or more output video layer sets or the one or more video layers. In some embodiments of method 1600, the format rule specifies that a payload type of the one or more scalable-nested supplemental enhancement information messages in the scalable nesting supplemental enhancement information message is 203, and a payload type of 203 for a supplemental enhancement information message indicates that the supplemental enhancement information message is a subpicture level information supplemental enhancement information message. In some embodiments of method 1600, the particular value of the first syntax element is equal to 1.

Figure 17:
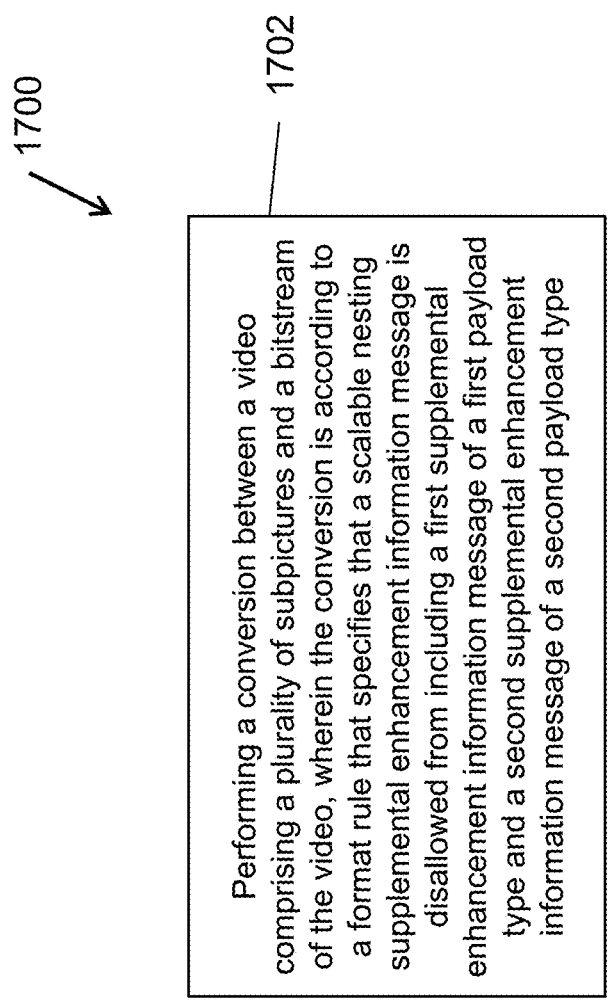

FIG. 17 is a flowchart for an example method 1700 of processing video data. Operation 1702 includes performing a conversion between a video comprising a plurality of subpictures and a bitstream of the video, wherein the conversion is according to a format rule that specifies that a scalable nesting supplemental enhancement information message is disallowed from including a first supplemental enhancement information message of a first payload type and a second supplemental enhancement information message of a second payload type.

In some embodiments of method 1700, the first payload type includes a payload type of a buffering period supplemental enhancement information message. In some embodiments of method 1700, the first payload type includes a payload type of a picture timing supplemental enhancement information message. In some embodiments of method 1700, the first payload type includes a payload type of a decoding unit information supplemental enhancement information message. In some embodiments of method 1700, the first payload type includes a payload type of a subpicture level information supplemental enhancement information message. In some embodiments of method 1700, the second payload type includes a payload type that is not one of the following: (i) the payload type of a buffering period supplemental enhancement information message, (ii) the payload type of a picture timing supplemental enhancement information message, (iii) the payload type of a decoding unit information supplemental enhancement information message, and (iv) the payload type of a subpicture level information supplemental enhancement information message.

Figure 18:
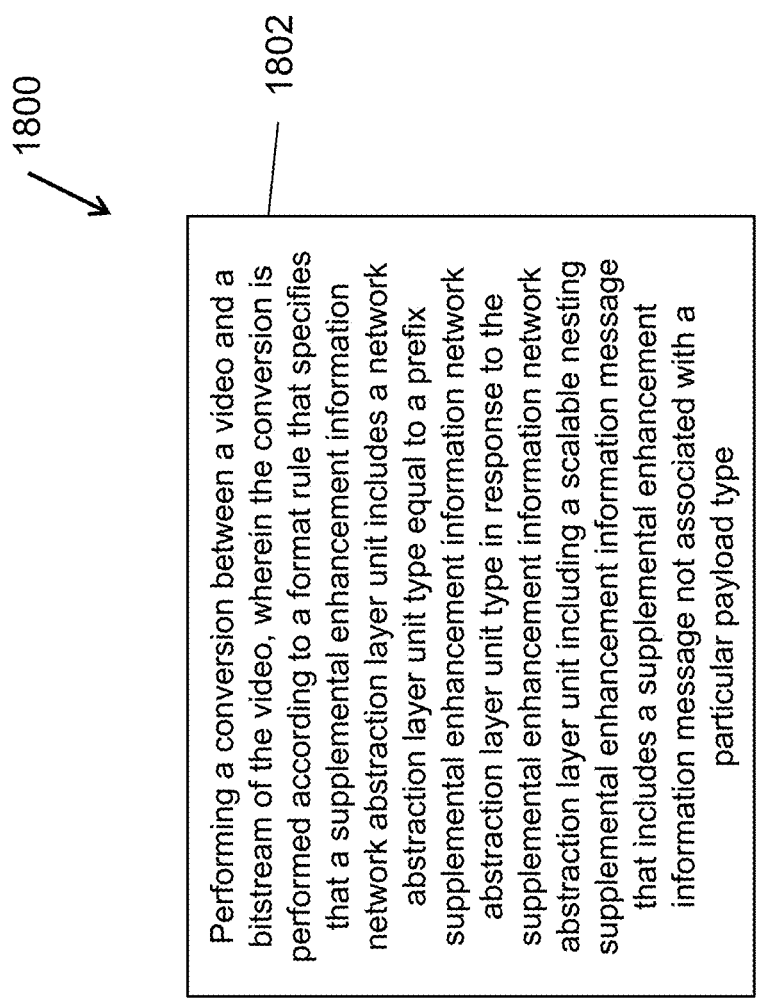

FIG. 18 is a flowchart for an example method 1800 of processing video data. Operation 1802 includes performing a conversion between a video and a bitstream of the video, wherein the conversion is performed according to a format rule that specifies that a supplemental enhancement information network abstraction layer unit includes a network abstraction layer unit type equal to a prefix supplemental enhancement information network abstraction layer unit type in response to the supplemental enhancement information network abstraction layer unit including a scalable nesting supplemental enhancement information message that includes a supplemental enhancement information message not associated with a particular payload type.

In some embodiments of method 1800, the network abstraction layer unit type is equal to PREFIX_SEI_NUT.

Figure 19:
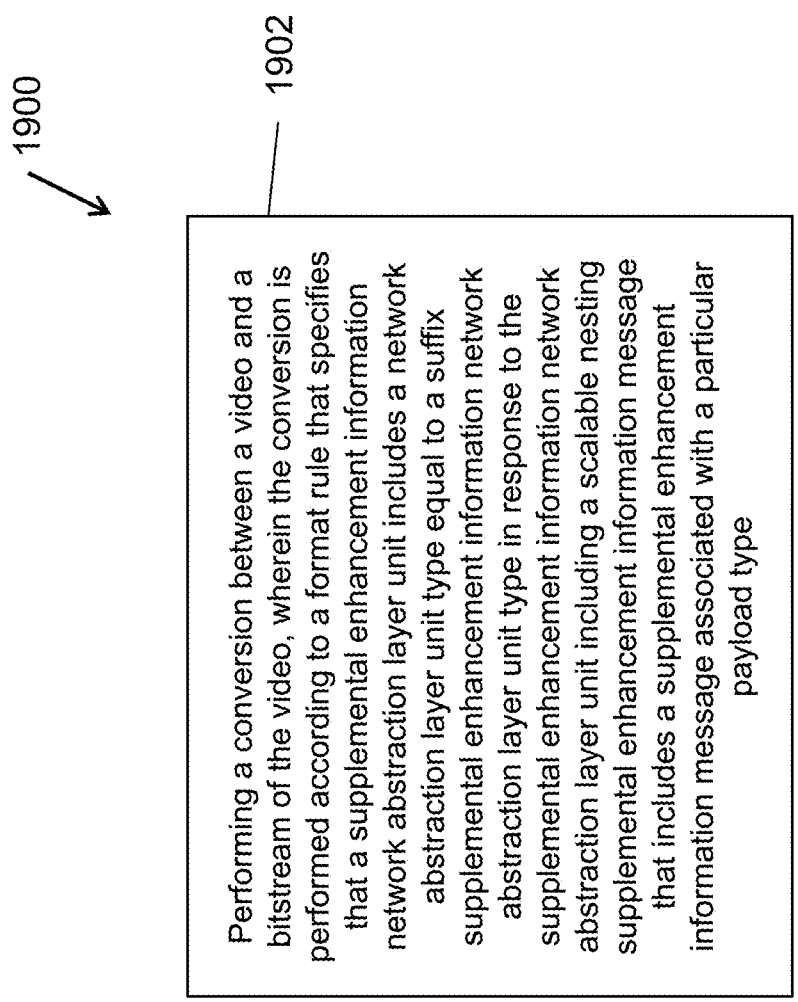

FIG. 19 is a flowchart for an example method 1900 of processing video data. Operation 1902 includes performing a conversion between a video and a bitstream of the video, wherein the conversion is performed according to a format rule that specifies that a supplemental enhancement information network abstraction layer unit includes a network abstraction layer unit type equal to a suffix supplemental enhancement information network abstraction layer unit type in response to the supplemental enhancement information network abstraction layer unit including a scalable nesting supplemental enhancement information message that includes a supplemental enhancement information message associated with a particular payload type.

In some embodiments of method 1900, the network abstraction layer unit type is equal to SUFFIX_SEI_NUT.

In some embodiments of method(s) 1800-1900, the particular payload type is a payload type of a decoded picture harsh supplemental enhancement information message. In some embodiments of method(s) 1800-1900, the particular payload type is associated with a value equal to 132.

In some embodiments of method(s) 1300-1900, performing the conversion comprises encoding the video into the bitstream. In some embodiments of method(s) 1300-1900, performing the conversion comprises generating the bitstream from the video, and the method further comprises storing the bitstream in a non-transitory computer-readable recording medium. In some embodiments of method(s) 1300-1900, performing the conversion comprises decoding the video from the bitstream. In some embodiments, a video decoding apparatus comprising a processor configured to implement method(s) 1300-1900 or an embodiment thereof. In some embodiments, a video encoding apparatus comprising a processor configured to implement method(s) 1300-1900 or an embodiment thereof. In some embodiments, a computer program product having computer instructions stored thereon, the instructions, when executed by a processor, causes the processor to implement method(s) 1300-1900 or an embodiment thereof. In some embodiments, a non-transitory computer-readable storage medium that stores a bitstream generated according to method(s) 1300-1900 or an embodiment thereof. In some embodiments, a non-transitory computer-readable storage medium storing instructions that cause a processor to implement method(s) 1300-1900 or an embodiment thereof. In some embodiments, a method of bitstream generation, comprising: generating a bitstream of a video according to method(s) 1300-1900 or an embodiment thereof, and storing the bitstream on a computer-readable program medium. In some embodiments, a method, an apparatus, a bitstream generated according to a disclosed method or a system described in the present disclosure.

Some embodiments of the present disclosure include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the present disclosure include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was disabled based on the decision or determination.

In the present disclosure, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., a field-programmable gate array (FPGA) or an application-specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electronically erasable programmable read-only memory (EEPROM), and flash memory devices; magnetic disks, e.g., internal hard disks or removable disks; magneto optical disks; and compact disc, read-only memory (CD-ROM) and digital versatile disc, read-only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of the present disclosure. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few embodiments and examples are described and other embodiments, enhancements and variations can be made based on what is described and illustrated in the present disclosure.

What is claimed is:

1. A method of processing video data, comprising:
performing a conversion between a video and a bitstream of the video,
wherein, during the conversion, one or more syntax elements included in a scalable nesting supplemental enhancement information (SEI) message are according to a format rule,
wherein the format rule specifies that the one or more syntax elements are used for indicating subpicture information for multiple subpicture layers, which are layers of the video that have pictures with multiple subpictures,
wherein scalable-nested SEI messages are allowed to apply to a single subpicture in each picture in layers that are not in the multiple subpicture layers, but are among layers in specific output layer sets (OLSs) to which the scalable-nested SEI messages apply, or among specific layers to which the scalable-nested SEI messages apply, and
wherein the format rule further specifies that a SEI network abstraction layer (NAL) unit containing the scalable nesting SEI message has a first NAL unit type equal to a prefix SEI NAL unit type in response to the scalable nesting SEI message containing a SEI message not associated with a particular payload type.

2. The method of claim 1, wherein the one or more syntax elements include a first syntax element, and wherein a value of the first syntax element plus 1 specifies a number of subpictures in each picture of the multiple subpicture layers.

3. The method of claim 2, wherein the value of the first syntax element is less than or equal to a value of a second syntax element in a sequence parameter set referred to by pictures in the multiple subpicture layers, and wherein the value of the second syntax element plus 1 specifies a number of subpictures in each picture referring to the sequence parameter set.

4. The method of claim 2, wherein the first syntax element is labeled as sn_num_subpics_minus1.

5. The method of claim 1, wherein the one or more syntax elements include a third syntax element, and wherein the third syntax element indicates a subpicture identifier of an i-th subpicture in each picture in the multiple subpicture layers.

6. The method of claim 1, wherein the format rule disallows one or more SEI messages having filler payload to be in the scalable nesting SEI message.

7. The method of claim 1, wherein the one or more SEI messages have a payload type value equal to 3.

8. The method of claim 1, wherein the format rule disallows one or more second SEI messages having scalable nesting that have a payload type value equal to 133 to be in the scalable nesting SEI message.

9. The method of claim 1, wherein the format rule specifies that a fourth syntax element in the scalable nesting SEI message in the bitstream is set to a particular value in response to the scalable nesting SEI message including one or more subpicture level information SEI messages, and
wherein the particular value of the fourth syntax element indicates that one or more scalable -nested SEI messages in the scalable nesting SEI message apply to a specific output video layer set.

10. The method of claim 9, wherein the format rule specifies that a value of a fifth syntax element in the bitstream is equal to 0 in response to the scalable nesting SEI message including the one or more subpicture level information SEI messages,
wherein the value of the fifth syntax element being equal to 0 specifies that the one or more scalable-nested SEI messages in the scalable nesting SEI message that apply to specified one or more output video layer sets or specified one or more video layers apply to all subpictures of the specified one or more output video layer sets or the specified one or more video layers,
wherein a payload type of 203 for a SEI message indicates that the SEI message is the subpicture level information SEI message, wherein the particular value of the fourth syntax element is equal to 1, wherein the format rule specifies that the scalable nesting SEI message is disallowed from including a first SEI message of a first payload type and a second SEI message of a second payload type,
wherein the first payload type includes a payload type of a buffering period SEI message, a payload type of a picture timing SEI message, a payload type of a decoding unit information SEI message, or a payload type of a subpicture level information SEI message, and
wherein the second payload type includes a payload type that is not one of the following: (i) the payload type of the buffering period SEI message, (ii) the payload type of the picture timing SEI message, (iii) the payload type of the decoding unit information SEI message, and (iv) the payload type of the subpicture level information SEI message.

11. The method of claim 1, wherein the first NAL unit type is equal to PREFIX_SEI_NUT,
wherein the format rule specifies that the SEI NAL unit containing the scalable nesting SEI message has a second NAL unit type equal to a suffix SEI NAL unit type in response to the scalable nesting SEI message containing a SEI message associated with the particular payload type,
wherein the second NAL unit type is equal to SUFFIX_SEI_NUT,
wherein the particular payload type is a payload type of a decoded picture hash SEI message,
wherein the particular payload type is associated with a value equal to 132.

12. The method of claim 1, wherein performing the conversion comprises encoding the video into the bitstream.

13. The method of claim 1, wherein performing the conversion comprises decoding the video from the bitstream.

14. An apparatus for processing video data comprising a processor and a non-transitory memory with instructions thereon, wherein the instructions upon execution by the processor, cause the processor to:
perform a conversion between a video and a bitstream of the video,
wherein, during the conversion, one or more syntax elements included in a scalable nesting supplemental enhancement information (SEI) message are according to a format rule,
wherein the format rule specifies that the one or more syntax elements are used for indicating subpicture information for multiple subpicture layers, which are layers of the video that have pictures with multiple subpictures,
wherein scalable-nested SEI messages are allowed to apply to a single subpicture in each picture in layers that are not in the multiple subpicture layers, but are among layers in specific output layer sets (OLSs) to which the scalable-nested SEI messages apply, or among specific layers to which the scalable-nested SEI messages apply, and
wherein the format rule further specifies that a SEI network abstraction layer (NAL) unit containing the scalable nesting SEI message has a first NAL unit type equal to a prefix SEI NAL unit type in response to the scalable nesting SEI message containing a SEI message not associated with a particular payload type.

15. The apparatus of claim 14, wherein the one or more syntax elements include a first syntax element, and wherein a value of the first syntax element plus 1 specifies a number of subpictures in each picture of the multiple subpicture layers,
wherein the value of the first syntax element is less than or equal to a value of a second syntax element in a sequence parameter set referred to by pictures in the multiple subpicture layers, and wherein the value of the second syntax element plus 1 specifies a number of subpictures in each picture referring to the sequence parameter set,
wherein the first syntax element is labeled as sn_num_subpics_minus1,
wherein the one or more syntax elements include a third syntax element, and wherein the third syntax element indicates a subpicture identifier of an i-th subpicture in each picture in the multiple subpicture layers,
wherein the format rule disallows one or more SEI messages having filler payload to be in the scalable nesting SEI message,
wherein the one or more SEI messages have a payload type value equal to 3,
wherein the format rule disallows one or more second SEI messages having scalable nesting that have a payload type value equal to 133 to be in the scalable nesting SEI message,
wherein the format rule specifies that a fourth syntax element in the scalable nesting SEI message in the bitstream is set to a particular value in response to the scalable nesting SEI message including one or more subpicture level information SEI messages,
wherein the particular value of the fourth syntax element indicates that one or more scalable-nested SEI messages in the scalable nesting SEI message apply to a specific output video layer set,
wherein the format rule specifies that a value of a fifth syntax element in the bitstream is equal to 0 in response to the scalable nesting SEI message including the one or more subpicture level information SEI messages,
wherein the value of the fifth syntax element being equal to 0 specifies that the one or more scalable-nested SEI messages in the scalable nesting SEI message that apply to specified one or more output video layer sets or specified one or more video layers apply to all subpictures of the specified one or more output video layer sets or the specified one or more video layers,
wherein a payload type of 203 for a SEI message indicates that the SEI message is the subpicture level information SEI message, wherein the particular value of the fourth syntax element is equal to 1, wherein the format rule specifies that the scalable nesting SEI message is disallowed from including a first SEI message of a first payload type and a second SEI message of a second payload type,
wherein the first payload type includes a payload type of a buffering period SEI message, a payload type of a picture timing SEI message, a payload type of a decoding unit information SEI message, or a payload type of a subpicture level information SEI message,
wherein the second payload type includes a payload type that is not one of the following: (i) the payload type of the buffering period SEI message, (ii) the payload type of the picture timing SEI message, (iii) the payload type of the decoding unit information SEI message, and (iv) the payload type of the subpicture level information SEI message,
wherein the first NAL unit type is equal to PREFIX_SEI_NUT,
wherein the format rule specifies that the SEI NAL unit containing the scalable nesting SEI message has a second NAL unit type equal to a suffix SEI NAL unit type in response to the scalable nesting SEI message containing a SEI message associated with the particular payload type,
wherein the second NAL unit type is equal to SUFFIX_SEI_NUT,
wherein the particular payload type is a payload type of a decoded picture hash SEI message, and
wherein the particular payload type is associated with a value equal to 132.

16. A non-transitory computer-readable storage medium storing instructions that cause a processor to:
perform a conversion between a video and a bitstream of the video,
wherein, during the conversion, one or more syntax elements included in a scalable nesting supplemental enhancement information (SEI) message are according to a format rule,
wherein the format rule specifies that the one or more syntax elements are used for indicating subpicture information for multiple subpicture layers, which are layers of the video that have pictures with multiple subpictures,
wherein scalable-nested SEI messages are allowed to apply to a single subpicture in each picture in layers that are not in the multiple subpicture layers, but are among layers in specific output layer sets (OLSs) to which the scalable-nested SEI messages apply, or among specific layers to which the scalable-nested SEI messages apply, and
wherein the format rule further specifies that a SEI network abstraction layer (NAL) unit containing the scalable nesting SEI message has a first NAL unit type equal to a prefix SEI NAL unit type in response to the scalable nesting SEI message containing a SEI message not associated with a particular payload type.

17. The non-transitory computer-readable storage medium of claim 16, wherein the one or more syntax elements include a first syntax element, and wherein a value of the first syntax element plus 1 specifies a number of subpictures in each picture of the multiple subpicture layers,
wherein the value of the first syntax element is less than or equal to a value of a second syntax element in a sequence parameter set referred to by pictures in the multiple subpicture layers, and wherein the value of the second syntax element plus 1 specifies a number of subpictures in each picture referring to the sequence parameter set,
wherein the first syntax element is labeled as sn_num_subpics_minus1,
wherein the one or more syntax elements include a third syntax element, and wherein the third syntax element indicates a subpicture identifier of an i-th subpicture in each picture in the multiple subpicture layers, wherein the format rule disallows one or more SEI messages having filler payload to be in the scalable nesting SEI message, wherein the one or more SEI messages have a payload type value equal to 3, wherein the format rule disallows one or more second SEI messages having scalable nesting that have a payload type value equal to 133 to be in the scalable nesting SEI message, wherein the format rule specifies that a fourth syntax element in the scalable nesting SEI message in the bitstream is set to a particular value in response to the scalable nesting SEI message including one or more subpicture level information SEI messages, wherein the particular value of the fourth syntax element indicates that one or more scalable -nested SEI messages in the scalable nesting SEI message apply to a specific output video layer set, wherein the format rule specifies that a value of a fifth syntax element in the bitstream is equal to 0 in response to the scalable nesting SEI message including the one or more subpicture level information SEI messages, wherein the value of the fifth syntax element being equal to 0 specifies that the one or more scalable-nested SEI messages in the scalable nesting SEI message that apply to specified one or more output video layer sets or specified one or more video layers apply to all subpictures of the specified one or more output video layer sets or the specified one or more video layers, wherein a payload type of 203 for a SEI message indicates that the SEI message is the subpicture level information SEI message, wherein the particular value of the fourth syntax element is equal to 1, wherein the format rule specifies that the scalable nesting SEI message is disallowed from including a first SEI message of a first payload type and a second SEI message of a second payload type, wherein the first payload type includes a payload type of a buffering period SEI message, a payload type of a picture timing SEI message, a payload type of a decoding unit information SEI message, or a payload type of a subpicture level information SEI message, wherein the second payload type includes a payload type that is not one of the following: (i) the payload type of the buffering period SEI message, (ii) the payload type of the picture timing SEI message, (iii) the payload type of the decoding unit information SEI message, and (iv) the payload type of the subpicture level information SEI message, wherein the first NAL unit type is equal to PREFIX_SEI_NUT, wherein the format rule specifies that the SEI NAL unit containing the scalable nesting SEI message has a second NAL unit type equal to a suffix SEI NAL unit type in response to the scalable nesting SEI message containing a SEI message associated with the particular payload type, wherein the second NAL unit type is equal to SUFFIX_SEI_NUT, wherein the particular payload type is a payload type of a decoded picture hash SEI message, and wherein the particular payload type is associated with a value equal to 132.

18. A non-transitory computer-readable recording medium storing a bitstream of a video which is generated by a method performed by a video processing apparatus, wherein the method comprises:

generating the bitstream of the video, wherein, during the generating, one or more syntax elements included in a scalable nesting supplemental enhancement information (SEI) message are according to a format rule, wherein the format rule specifies that the one or more syntax elements are used for indicating subpicture information for multiple subpicture layers, which are layers of the video that have pictures with multiple subpictures, wherein scalable-nested SEI messages are allowed to apply to a single subpicture in each picture in layers that are not in the multiple subpicture layers, but are among layers in specific output layer sets (OLSs) to which the scalable-nested SEI messages apply, or among specific layers to which the scalable-nested SEI messages apply, and wherein the format rule further specifies that a SEI network abstraction layer (NAL) unit containing the scalable nesting SEI message has a first NAL unit type equal to a prefix SEI NAL unit type in response to the scalable nesting SEI message containing a SEI message not associated with a particular payload type.

19. The non-transitory computer-readable recording medium of claim 18, wherein the one or more syntax elements include a first syntax element, and wherein a value of the first syntax element plus 1 specifies a number of subpictures in each picture of the multiple subpicture layers, wherein the value of the first syntax element is less than or equal to a value of a second syntax element in a sequence parameter set referred to by pictures in the multiple subpicture layers, and wherein the value of the second syntax element plus 1 specifies a number of subpictures in each picture referring to the sequence parameter set, wherein the first syntax element is labeled as sn_num_subpics_minus1, wherein the one or more syntax elements include a third syntax element, and wherein the third syntax element indicates a subpicture identifier of an i-th subpicture in each picture in the multiple subpicture layers, wherein the format rule disallows one or more SEI messages having filler payload to be in the scalable nesting SEI message, wherein the one or more SEI messages have a payload type value equal to 3, wherein the format rule disallows one or more second SEI messages having scalable nesting that have a payload type value equal to 133 to be in the scalable nesting SEI message, wherein the format rule specifies that a fourth syntax element in the scalable nesting SEI message in the bitstream is set to a particular value in response to the scalable nesting SEI message including one or more subpicture level information SEI messages, wherein the particular value of the fourth syntax element indicates that one or more scalable -nested SEI messages in the scalable nesting SEI message apply to a specific output video layer set, wherein the format rule specifies that a value of a fifth syntax element in the bitstream is equal to 0 in response to the scalable nesting SEI message including the one or more subpicture level information SEI messages, wherein the value of the fifth syntax element being equal to 0 specifies that the one or more scalable-nested SEI messages in the scalable nesting SEI message that apply to specified one or more output video layer sets or specified one or more video layers apply to all subpictures of the specified one or more output video layer sets or the specified one or more video layers, wherein a payload type of 203 for a SEI message indicates that the SEI message is the subpicture level information SEI message, wherein the particular value of the fourth syntax element is equal to 1, wherein the format rule specifies that the scalable nesting SEI message is disallowed from including a first SEI message of a first payload type and a second SEI message of a second payload type, wherein the first payload type includes a payload type of a buffering period SEI message, a payload type of a picture timing SEI message, a payload type of a decoding unit information SEI message, or a payload type of a subpicture level information SEI message, wherein the second payload type includes a payload type that is not one of the following: (i) the payload type of the buffering period SEI message, (ii) the payload type of the picture timing SEI message, (iii) the payload type of the decoding unit information SEI message, and (iv) the payload type of the subpicture level information SEI message, wherein the first NAL unit type is equal to PREFIX_SEI_NUT, wherein the format rule specifies that the SEI NAL unit containing the scalable nesting SEI message has a second NAL unit type equal to a suffix SEI NAL unit type in response to the scalable nesting SEI message containing a SEI message associated with the particular payload type, wherein the second NAL unit type is equal to SUFFIX_SEI_NUT, wherein the particular payload type is a payload type of a decoded picture hash SEI message, and wherein the particular payload type is associated with a value equal to 132.

\* \* \* \* \*